(12) United States Patent
Aldridge et al.

(10) Patent No.: US 10,578,762 B2
(45) Date of Patent: *Mar. 3, 2020

(54) SYSTEMS AND METHODS FOR LOCATING AND IMAGING PROPPANT IN AN INDUCED FRACTURE

(71) Applicants: CARBO CERAMICS INC., Houston, TX (US); National Technology & Engineering Solutions of Sandia, LLC, Albuquerque, NM (US)

(72) Inventors: David F. Aldridge, Albuquerque, NM (US); Lewis Bartel, Albuquerque, NM (US)

(73) Assignees: CARBO CERAMICS, INC., Houston, TX (US); National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/935,787

(22) Filed: Mar. 26, 2018

(65) Prior Publication Data

US 2018/0210108 A1    Jul. 26, 2018

Related U.S. Application Data

(63) Continuation of application No. 14/323,674, filed on Jul. 3, 2014, now Pat. No. 9,927,549.

(Continued)

(51) Int. Cl.
*G01V 3/30* (2006.01)
*G01V 99/00* (2009.01)
(Continued)

(52) U.S. Cl.
CPC ............ *G01V 3/30* (2013.01); *G01V 3/26* (2013.01); *G01V 3/38* (2013.01); *G01V 99/00* (2013.01); *G01V 99/005* (2013.01)

(58) Field of Classification Search
None
See application file for complete search history.

(56) References Cited

U.S. PATENT DOCUMENTS

| 2005/0017723 A1* | 1/2005 | Entov ............... E21B 43/26 324/346 |
| 2010/0250207 A1 | 9/2010 | Rodney |

(Continued)

FOREIGN PATENT DOCUMENTS

| CN | 102099545 A | 6/2011 |
| WO | 2014004815 A1 | 1/2014 |

(Continued)

OTHER PUBLICATIONS

Office Action for Eurasian Patent Application No. 201691784 dated Oct. 27, 2017.

(Continued)

*Primary Examiner* — Sujoy K Kundu
*Assistant Examiner* — Terence E Stifter, Jr.
(74) *Attorney, Agent, or Firm* — Patterson + Sheridan, LLP

(57) ABSTRACT

Born Scattering Inversion (BSI) systems and methods are disclosed. A BSI system may be incorporated in a well system for accessing natural gas, oil and geothermal reserves in a geologic formation beneath the surface of the Earth. The BSI system may be used to generate a three-dimensional image of a proppant-filled hydraulically-induced fracture in the geologic formation. The BSI system may include computing equipment and sensors for measuring electromagnetic fields in the vicinity of the fracture before and after the fracture is generated, adjusting the parameters of a first Born approximation model of a scattered component of the surface electromagnetic fields using the measured electromag- (Continued)

netic fields, and generating the image of the proppant-filled fracture using the adjusted parameters.

22 Claims, 9 Drawing Sheets

Related U.S. Application Data

(60) Provisional application No. 61/948,169, filed on Mar. 5, 2014.

(51) Int. Cl.
*G01V 3/26* (2006.01)
*G01V 3/38* (2006.01)

(56) References Cited

U.S. PATENT DOCUMENTS

| | | | |
|---|---|---|---|
| 2011/0272147 A1* | 11/2011 | Beasley | E21B 43/26 166/250.1 |
| 2012/0181020 A1 | 7/2012 | Barron et al. | |
| 2013/0018585 A1* | 1/2013 | Zhdanov | G01V 3/083 702/2 |
| 2013/0138408 A1* | 5/2013 | Lee | G06F 17/16 703/2 |
| 2014/0041862 A1* | 2/2014 | Ersoz | G01V 3/30 166/250.1 |

FOREIGN PATENT DOCUMENTS

| | | | | |
|---|---|---|---|---|
| WO | WO 2014004815 A1 | * | 1/2014 | E21B 43/267 |
| WO | WO-2014004815 A1 | * | 1/2014 | E21B 43/267 |
| WO | 2015134054 A1 | | 9/2015 | |

OTHER PUBLICATIONS

International Search Report and Written Opinion of ISA/US prepared for PCT/US20141045427, dated Jan. 21, 2015.
Office Action for U.S. Appl. No. 14/323,674 dated Jan. 3, 2017.
Final Office Action for U.S. Appl. No. 14/323,674 dated Sep. 12, 2017.
International Search Report and Written Opinion of ISA/US prepared for PCT/US2014/045427, dated Jan. 21, 2015.
Office Action for U.S. Appl. No. 14/592,225 dated Jun. 22, 2015.
Zhdanov, M., 'Geophysical Inverse Theory and Regularization Problems', Elsevier Science, 2002, eBook ISBN: 9780080532509, Hardcover ISBN: 9780444510891.
Li, F. et al., 'Three-Dimensional Reconstruction of Objects Buried in Layered Media Using Born and Distorted Born Iterative Methods', IEEE Geoscience and Remote Sensing Letters, 2004, vol. 1, No. 2.
Office Action for Australian Application No. 2014385193 dated Feb. 8, 2019.
Office Action for Egyptian Application No. PCT/1467/2016 dated Dec. 20, 2018.
Office Action for Chinese Application No. 201480076846.1 dated Feb. 3, 2019.
Search Report for Chinese Application No. 201480076846.1 dated Jan. 25, 2019.

\* cited by examiner

SYSTEMS AND METHODS FOR LOCATING AND IMAGING PROPPANT IN AN INDUCED FRACTURE

CROSS-REFERENCE TO RELATED APPLICATIONS

This application claims the benefit of and priority to U.S. Non-Provisional patent application Ser. No. 14/323,674 filed Jul. 3, 2014, which claims the benefit of and priority to U.S. Provisional Patent Application No. 61/948,169 filed Mar. 5, 2014, each of which is hereby incorporated by reference in its entirety.

STATEMENT OF GOVERNMENTAL INTEREST

The United States Government has rights in this invention pursuant to Contract No. DE-AC04-94AL85000 between the United States Department of Energy and Sandia Corporation, for the operation of the Sandia National Laboratories.

BACKGROUND

As the population of the world increases, efficient mechanisms for obtaining sources of energy, including natural gas, oil and geothermal reserves are continuously being investigated. One exemplary technique for obtaining access to natural gas, oil and geothermal reserves is known as hydraulic fracturing. Hydraulic fracturing is the process of initiating and subsequently propagating a fracture in a geologic formation through utilization of fracturing fluid. To create the fracture in the geologic formation, a drill is employed to create a well bore that reaches depths of several thousand feet (until a desired geologic formation is reached). A well casing is placed in the well bore. The well casing is typically composed of steel. The well casing is cemented in place to stabilize the well casing with respect to the Earth.

Hydraulic fracturing is commonly employed to enhance the fluid flow permeability of shale geologic formations for petroleum (oil and/or natural gas) and geothermal energy production. Subsequent to the well casing being cemented in place, a fracturing fluid pumped down the well bore and through perforations in the well casing at a pressure that is in excess of the fracture gradient of the geologic formation. Such pressure causes the geologic formation to fracture. Pumping of the fracturing fluid down the well bore is continued to extend the fracture further into the formation. As the fracture extends, a proppant is added to the fracture fluid and pumped down the well bore and into the fracture, thereby propping the fracture open when pumping of the fracture fluid ceases. This causes the geologic formation to become permeable via the fracture, thereby allowing natural gas or oil to be extracted from the geologic formation. Hydraulic fractures can be induced using vertical, horizontal and/or slanted wells. This process is commonly referred to as hydraulic fracturing.

Because a typical fracture occurs thousands of feet beneath the surface of the Earth and because a fracture can extend from the well bore in a variety of directions and orientations, it is difficult to determine the location of a fracture within the geologic formation. Modeling techniques have been developed in which, prior to a hydraulic fracturing operation, electromagnetic fields at the surface of the Earth resulting from an application of an electric current to various hypothetical fractures through the well bore are calculated. Following the hydraulic fracturing operation, an electromagnetic field measured at the surface of the Earth is used to select from the various hypothetical fractures. Although these modeling techniques have been successful in helping to locate induced fractures, they are limited by the number and accuracy of the hypothetical fractures used to compute the predicted fields.

In contrast to these forward modeling approaches, an inverse modeling solution in which measured fields are used to infer the location and orientation of the fracture, rather than simply selecting from a group of hypothetical fractures, has long been desired. However, in order to infer fracture location, orientation, geometry, etc., from measured EM field data using conventional techniques, EM field data must be computed and compared with the measured field data many times. Because the computation time for computing a model can be long, it has been economically and practically infeasible to wait for this type of inverse model computation after a hydraulic fracturing operation and before the extraction of the natural gas, oil or geothermal resources. No economically and computationally feasible inverse modeling solution has therefore been forthcoming.

It would therefore be desirable to provide improved systems and methods for evaluating well hydraulic fracturing and completion techniques useful in extracting natural gas, oil and geothermal reserves from a geologic formation.

SUMMARY

The following is a brief summary of subject matter that is described in greater detail herein. This summary is not intended to be limiting as to the scope of the claims.

Described herein are various technologies pertaining to modeling the properties of a fracture in a geologic formation. Properties include fracture size and geometry. These properties are determined or inferred from determined proppant and/or fracture properties. The fracture may be used to extract natural gas, oil and geothermal reserves from the geologic formation The disclosed methodology and associated modeling utilizes electromagnetic (EM) energy scattered from a subsurface geological, geophysical or artificial feature of interest to produce a highly-resolved three-dimensional (3D) image of the feature. The method includes producing an image or representation of a hydraulic fracture induced in a subsurface geologic formation after the fracture has been injected with propping material ("proppant") with favorable EM characteristics.

In various embodiments, properties such as the size, shape, location, orientation and/or extent of the proppant pack and fracture may be determined in an economically and computationally feasible inverse modeling operation. The modeling operation may be used to generate a three-dimensional image of proppant material within a fracture. As used herein, the terms "proppant material" and "proppant" refer to material that includes many (e.g., thousands, millions or more) of individual proppant particles or elements.

According to the present invention, a model is disclosed that estimates or calculates electromagnetic (EM) field values at the locations of one or more sensors at or near the surface of the Earth and then adjusts calculated EM field values in the model's Earth volume based on measured electromagnetic field data gathered by the sensors before and after a hydraulic fracking operation. The model includes a geophysical model, which may be referred to as an "earth model," of a volume of the Earth that includes at least a portion of a geologic formation and a well bore. The geophysical model is a three dimensional representation of the EM medium properties of the volume of interest, including but not limited to the geologic formation, well bore and casing, overburden, and the surface of the earth over the volume.

The model includes a First Born Approximation (FBA) model component, which may be referred to herein as a First Born Approximation modeling procedure, calculation or operation. The FBA model includes a calculation using measured EM fields taken before and after a fracturing operation to adjust parameters in the FBA model. This method may be referred to as a Born Scattering Inversion (BSI) operation.

The FBA is a mathematical approximation to Maxwell's equations (the governing equations of electromagnetism) that posits that the strength of an electromagnetic wavefield scattered by a localized contrast in material properties (e.g., a proppant-filled fracture in a geologic formation) is linearly related to the strength of the incident electromagnetic wavefield, and the magnitude of the contrast. This contrast can be described at various locations using a set of adjustable parameters in an FBA model.

The FBA modeling operation includes two successive executions of an electromagnetic modeling algorithm. In the first execution, incident electromagnetic fields, which may be referred to a primary EM fields, at one or more predetermined locations in the volume of the Earth are calculated. In the second execution, each of the predetermined locations are treated as an electromagnetic wavefield source (sometimes referred to herein as a Born scatterer or a Born scattering source) that is activated by the previously computed incident electromagnetic field waveforms. In the second execution, scattered EM fields, which may be referred to as secondary electromagnetic fields, from the Born scatterers at the locations of the sensors at the surface of the Earth are computed.

The adjustable parameters of the FBA model are scaling values that determine a relation between the strength of the incident electromagnetic wavefield and the scattered electromagnetic field. The scaling values correspond to scattering amplitudes of a plurality of Born scatterers. The scattered electromagnetic fields are calculated using initial values such as unit values for the adjustable parameters or an estimated value of an EM parameter.

EM field data are measured or obtained before and after fracturing and proppant placement. The difference between the field data before, during and/or after the hydraulic fracturing operation is equivalent to a scattered EM field that is generated primarily by a change in the electromagnetic properties of some locations within a volume of Earth. The change in the EM properties at some of these locations can be the result of the presence of the proppant in the fracture. The difference between the measured field data before and after the hydraulic fracturing operation may therefore be compared to the calculated scattered EM fields from the Born scatterers to determine proppant or proppant pack location.

The field data are then used to adjust parameters of the FBA model so that the calculated scattered EM fields match the difference in the measured EM fields to within a predetermined or actively determined range. In some embodiments, the adjusted values of the adjustable parameters are determined by the measured field data. In some embodiments, adjusting the parameters may include a linear inverse operation that directly solves for the adjusted parameters. In another embodiment, adjusting the parameters may be by another technique or operation that adjusts the strength of the parameters by, such as, but not limited to EM migration, full waveform inversion, and Monte Carlo techniques. The adjusted parameters for each location may indicate whether proppant is present at that location, because the change in the EM properties at the locations of the Born scatterers is due to the presence (or lack) of proppant material at those locations.

In one illustrative example, an adjusted parameter that is equal to zero for a Born scatterer may indicate that that Born scatterer is not located within a proppant-filled fracture or that a fracture is not present. An adjusted parameter that is different than zero for another Born scatterer may indicate that that Born scatterer is located within a proppant-filled fracture. The values of the adjusted parameters may therefore be used to determine a location, shape, size, extent, and/or orientation of proppant in the fracture. In a modeling operation in which a three-dimensional distribution of Born scatterers is used, the values of the adjusted parameters may be used to form a three-dimensional image of proppant within a fracture or elsewhere in a well system.

According to an embodiment, a system is provided that includes a database and a processor that calculates EM field values, receives measured EM field data, and adjusts, based on the measured EM field data, the calculated EM field values. The database and processor may include one or more databases and/or processors.

According to an embodiment, the database stores a geophysical model of a volume of Earth including a geologic formation and a well bore, a set of Born scatterer locations within the volume, an EM model for simulating or calculating EM data, and a set of sensor locations. The processor calculates the EM field values at the set of sensor locations using the EM model and the geophysical model, and receives measured EM field data gathered at the set of sensor locations to adjust EM parameters. The electromagnetic model includes a first Born approximation model calculating a magnitudes a plurality of Born scatterers at a set of predetermined locations within the volume.

According to another embodiment, the processor calculates the EM field values at a set of sensor locations by computing primary electric field values at the set of predetermined Born Scatterer locations within the volume and computing secondary electric field values at the set of sensor locations using the primary electric field values at the set of Born scatterer locations within the volume.

According to an embodiment, a method is provided that includes determining a plurality of scattered electromagnetic field values using a model having adjustable parameters, performing a hydraulic fracturing operation to create a fracture in a geologic formation, providing an electromagnetically suitable proppant into the fracture, gathering, prior to the hydraulic fracturing operation, a plurality of measured electromagnetic field values at a first plurality of sensor locations, gathering, with the electromagnetically suitable proppant in the fracture, an additional plurality of measured electromagnetic field values at a second plurality of sensor locations, determining a difference between the plurality of measured electromagnetic field values and the additional plurality of measured electromagnetic field values, and modifying at least some of the adjustable parameters based on a comparison of the difference between the plurality of scattered electromagnetic field values taken before and after fracturing. The model includes a first Born approximation model portion. According to an embodiment, the first plurality of sensor locations is the same as the second plurality of sensor locations. According to another embodiment, the first plurality of sensor locations is different than the second plurality of sensor locations.

According to an embodiment, a system is provided that includes a conductive well casing in a well bore that extends from the surface of the Earth to a geologic formation within the Earth, an electricity source conductively coupled to the conductive well casing, a proppant in a fracture in the geologic formation and conductively coupled to the well casing, a plurality of sensors at a corresponding plurality of sensor locations, wherein the sensors are configured to gather electromagnetic field data generated when a current is applied to the conductive well casing using the electricity source, and computing equipment that includes memory that stores a plurality of electromagnetic field values at the plurality of sensor locations based on a first Born approximation model that includes a plurality of adjustable scaling factors, and a processor configured to receive the electromagnetic field data from the plurality of sensors, adjust the adjustable scaling factors based on the electromagnetic field data, and generate an image of the proppant using the adjusted adjustable scaling factors.

According to an embodiment of the invention, a system and method for imaging a fracture is disclosed that includes field acquisition of EM data, insertion of favorable proppant material within the fracture, computer processing and modeling of the recorded data, and ultimately constructing a 3D image. Two sets of electromagnetic field data are acquired, before and after a hydraulic fracturing operation. Recorded EM data consist of time series of components of the electric vector $e(x_r,t)$, the magnetic vector $h(x_r,t)$, or both, observed at a set of receiver locations $x_r$.

According to an embodiment of the invention, the field data acquisition method includes that the EM energy sources and sensors in both recording experiments occupy the same or similar positions. The other recording conditions (e.g., EM energy source magnitudes, waveforms, and orientations; EM receiver sensitivities and orientations, recording system filters and sampling characteristics, etc.) are maintained identical or as closely as possible between the two data collections. Extraneous sources of EM energy should be minimized and ambient noise levels associated with the repeated experiments should be nearly the same. The intention is that the difference in recorded EM data from the two experiments is attributable solely to the presence of the proppant-filled fracture. The method is not limited to any particular field data acquisition configuration. Rather, EM energy sources and receivers may be deployed on the earth's surface or within subsurface boreholes (vertical, horizontal, dipping). Line arrays, areal arrays, or even volumetric arrays (as with multiple boreholes) of EM sources and receivers may be utilized. However, proximity of sources and receivers to the target of interest will enhance recorded EM signal levels and provide a better-constrained inversion result.

According to another embodiment of the invention, the EM energy sources and/or sensors used before and after the fracturing and proppant placement are not located in the same positions, but the data is interpolated to determine the difference in EM signals at the same geophysical locations.

After the fracture is induced, it is injected with proppant material possessing EM characteristics that differ from the surrounding geologic formation. The salient EM properties are current conductivity ($\sigma$) electric permittivity ($\varepsilon$), and magnetic permeability ($\mu$). The proppant may be enhanced in any one, or any combination (including all three concurrently), of these properties with respect to the surrounding medium. The stronger the EM material property contrast between the proppant and the geologic formation, the stronger will be the scattered electromagnetic wavefield recorded in the post-fracturing data acquisition experiment.

The basic data utilized for imaging of a proppant-filled fracture consists of the difference in EM data recorded by pre-fracture and post-fracture field experiments. This difference data is directly modeled (or simulated) by a numerical algorithm based on the First Born Approximation (FBA) applied to electromagnetic wavefield propagation/diffusion. The FBA posits that the strength of an EM wavefield scattered by a localized contrast in material properties (like a proppant-filled fracture) is linearly related to the strength of the incident EM wavefield, and the magnitude of the parameter contrast. FBA methodology involves two successive executions of an EM modeling algorithm. In the first run, the EM wavefield incident onto a 3D target is recorded by a finite set of multi-component EM receivers distributed over the volume occupied by the target. For the case of a hydraulic fracture initiated at a known point in a borehole, a reasonable estimate of the location and extent of this volume is readily made. In the second FBA modeling run, the receivers are considered EM wavefield sources activated by the incident EM waveforms. Source magnitudes are proportional to the EM property contrasts (current conductivity, electric permittivity, magnetic permeability) associated with the target material (proppant in the fracture). The EM wavefield radiated from these sources (often referred to as "Born scattering sources") is recorded by sensors located at the field data acquisition positions. An important consideration for both FBA modeling runs is that a good estimate of the 3D EM earth model supporting electromagnetic wave propagation is available. Any preferred numerical modeling methodology (i.e., finite-differences, finite-elements, discontinuous Galerkin, Green functions, layered media propagators, etc.) may be utilized to calculate EM data. The fracture imaging approach described here is not dependent upon a particular numerical technique.

FBA modeling directly simulates the difference between EM data recorded by the two field experiments. Of course, accurate agreement between calculated and observed data is not initially expected for two reasons: i) the 3D numerical earth model supporting EM wave propagation differs (hopefully only slightly) from the 3D true earth model, and ii) the strengths of the Born scattering sources located in the target volume are not known sufficiently precisely. In this step of the fracture imaging procedure, the strengths of these sources are adjusted until calculated and observed EM data agree to within a prescribed tolerance. A common measure of data misfit is a weighted least squares difference between the observed EM time series data and the analogous data simulated by the FBA modeling approach. Recall that in this context, the word "data" refers to the difference in EM time series data recorded by the pre- and post-fracture experiments. The described procedure constitutes a geophysical inverse problem, whereby the strengths of the Born scattering sources are quantitatively inferred by minimizing the data misfit. In fact, this is a linear inverse problem that is solved via relatively simple methods from linear algebra. The size or "scale" of the inverse problem is determined by the number of Born scattering sources (equal to the number of multi-component EM receivers distributed over the target volume), which may range into the low thousands.

After the strengths of the many Born scattering sources are determined, an image of the proppant-filled fracture is obtained by visualizing (with any preferred visualization software) the 3D distribution of these Born scatterers. The visual image (or map, or picture) is amplitude-calibrated to distinguish the spatially-variable scattering strengths. The visual image may be amplitude calibrated using a color plotting scheme. These strengths are proportional to the contrast in EM properties (current conductivity, electric permittivity, and magnetic permeability) possessed by the injected proppant relative to the surrounding geologic medium. In effect, the fracture is defined by the 3D distribution of amplitude-calibrated Born scattering sources. If the proppant does not have sufficient parameter contrast, or if it not injected into remote parts of the hydraulic fracture, then it will not be imaged via this technique. The disclosed procedure may be used to infer the spatial extent of proppant fill within a fracture.

Other aspects will be appreciated upon reading and understanding the attached figures and description.

DETAILED DESCRIPTION

Figure 1:
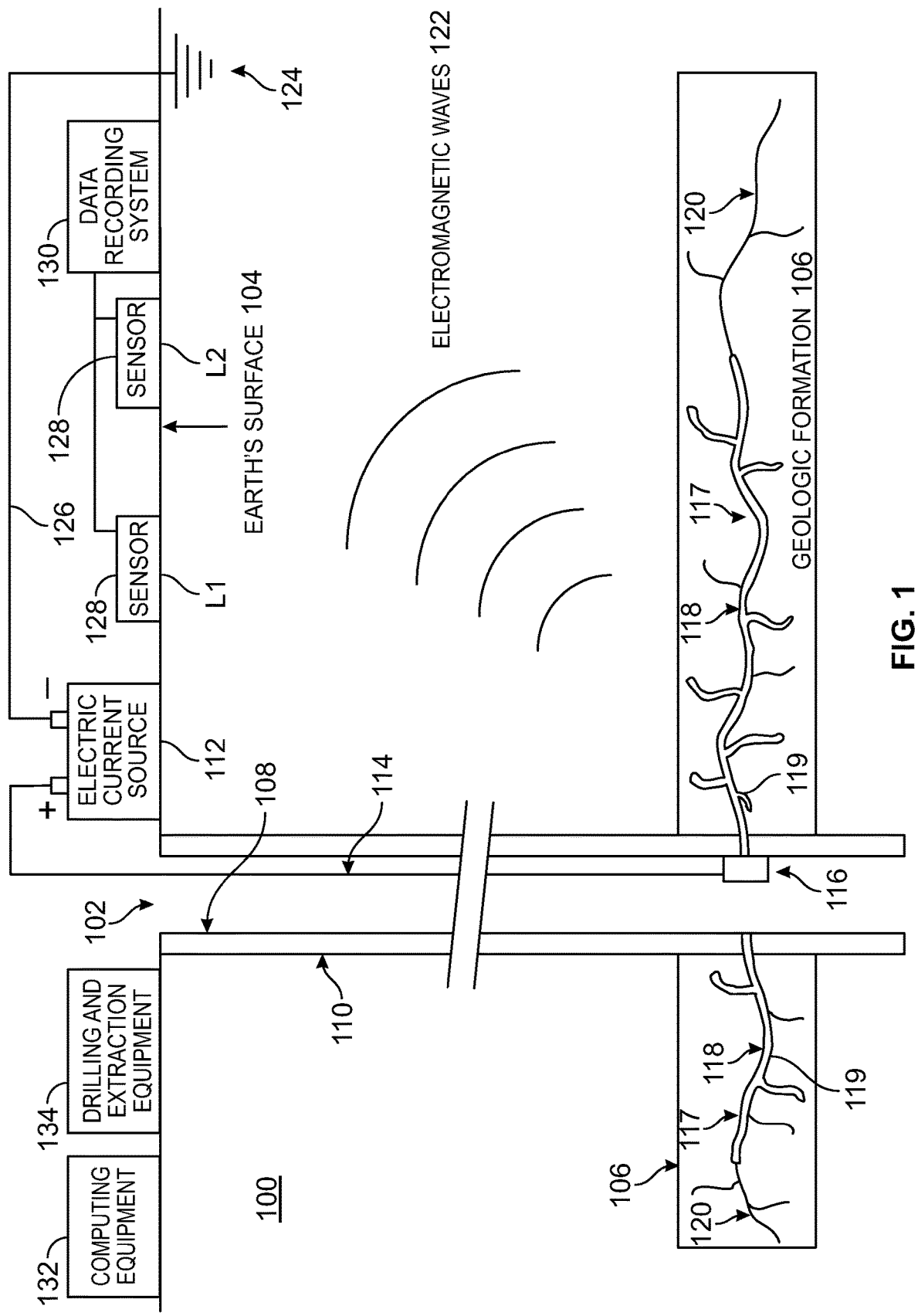
FIG. 1 is an exemplary diagram of a well system that is configured to extract natural gas or oil from a geologic formation beneath the surface of the Earth in accordance with an embodiment.

Various technologies pertaining to modeling a fracture in a geologic formation will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, a component may be configured to perform functionality that is described as being carried out by multiple components. Additionally, as used herein, the term "exemplary" is intended to mean serving as an illustration or example, and is not intended to indicate a preference.

As used herein, the term "component" is intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference now to FIG. 1, an extraction system (system) 100 according to an embodiment of the disclosure is disclosed. The extraction system 100 is configured to extract natural gas, oil or geothermal resources by way of an induced fracture 117. The system 100 includes a well bore 102, which extends from the Earth's surface 104 to a subsurface geologic formation (formation) 106 that contains oil, natural gas or geothermal resources. While the well bore 102 is shown as being vertical in nature, it is to be understood that the well bore 102 and/or the formation may be vertical, horizontal, dipping, diagonal, slanting or any combination of these. As is well known, the well bore may extend generally vertical to reach the subsurface formation and then turn horizontal to extend horizontally or laterally through the formation. In such a configuration, the induced fracture 117 may extend vertically and/or horizontally outward from the well bore 102. In an exemplary embodiment, the formation 106 may be several thousand feet below the surface 104 of the Earth. Formation 106 may, for example, consist of shale rock. A well casing 108 may be positioned in the well bore 102 and extend from the surface 104 to or through to below the formation 106. The well casing 108 can be installed in the well bore 102 through utilization of any suitable method. Typically, the well casing 108 is formed of steel. A cement stabilizer 110 may be formed to stabilize the well casing 108 in the well bore 102. The cement stabilizer 110 stabilizes the casing 108 as fracture fluid and/or a proppant is transferred to the formation 106, possibly under high pressure. The cement stabilizer 110 can also stabilize the well casing 108 as natural gas, oil or thermal fluids are extracted from the geologic formation 106 by way of the well bore 102.

Through utilization of a fracturing fluid under high pressure, a fracture 117 including first portions 118 and second portions 120 is induced in the formation 106. In this exemplary embodiment, the fracture 117 is shown simplified as first and second portions 118, 120, however, it should be understood that the fracture 117 may contain several or multiple fractures, extending horizontally, vertically, and at various angles, and separate or branching from other induced fractures and combinations thereof. The fracture may extend laterally and vertically some distance in all directions from well bore 102. A proppant 119 is directed down the well bore 102 and fills or partially fills the first portions 118 of the fracture 117, thereby causing the first portions 118 to remain open (and thus causing the formation 106 to be more permeable for fluid flow). The proppant 119 filling the first portions 118 may be referred to as a "proppant pack" filling the first portions 118 of the fracture 117. The second portions 120 of the fracture 117 are not filled by proppant 119 and are typically filled with water, sand, gas and/or other rock particles from the surrounding formation 106.

An electric current source 112, which typically resides on the Earth's surface 104 is coupled to the casing 108 at a current injection (or current application) point 116 (e.g., positioned near the bottom of well bore 102 in contact with casing 108 proximate to the geologic formation 106 and the proppant-filled fracture 118). In another embodiment, the electric current source 112 may reside on or below the surface. In another embodiment, the current injection point 116 may be located within geologic formation 106, but not in contact with fracture portion 118, or it may be located entirely outside geologic formation 106. Electric current is carried from the current source 112 to the injection point 116 via an insulated wire 114 within the well bore 102. Alternately, the insulated wire 114 may be located on the exterior of the casing 108 (i.e., between casing 108 and cement 110). In still another embodiment, the electric current source 112 may be located within well bore 102 proximate to the current injection point 116. The electric current source 112 may be configured to generate current waveforms of various types (i.e., pulses, continuous wave, or repeating or periodic waveforms). Accordingly, the well casing 108 can be electrically energized and act as a spatially-extended source of electric current.

Some of the electric current generated by the source 112 can travel from the well casing 108 through the proppant 119 of the induced fracture 117 of the geologic formation 106. Electromagnetic fields generated by the current in the well casing 108 and that propagate to various locations in a volume of Earth can be altered by the presence of the proppant following the injection of the proppant 119 into a fracture 117.

The proppant 119 can be chosen to have electromagnetically suitable properties for generating, propagating, and/or scattering electromagnetic fields that can be detected at the Earth's surface 104. For example, the proppant 119 may be chosen to have a particular electric permittivity, magnetic permeability, current conductivity, and/or other electromagnetic or mechanical properties that are different from the corresponding properties of the surrounding rock of formation 106. In this way, a first portions 118 of a fracture 117 that is filled with proppant 119 will have different electromagnetic properties from the second portions 120 of the fracture 117 not filled with proppant 119, as well as the rock of the surrounding geologic formation 106. The proppant 119 can, for example, be formed from an electrically conductive material to significantly enhance the electric conductivity of the first portions 118.

In one embodiment, all of the proppant that is injected into the well bore and the fracture can be formed from the conductive proppant material. However, this is merely illustrative. In various embodiments, the proppant material can include portions having different electromagnetic properties in different portions of the well bore and/or the fracture. For example, in some circumstances it may be desirable to have conductive proppant in one portion of a fracture (e.g., a portion of the fracture that is furthest from the well bore or a portion of the fracture that is nearest to the well bore) and non-conductive proppant in another portion of the fracture or in the well bore. In another example, in may be desirable to have proppant material with continuously or discretely varying electromagnetic properties as a function of the position of the proppant material in the fracture.

Providing proppant material having differing electromagnetic properties (e.g., non-conductive and conductive proppant) into a fracture may include mixing conductive materials of differing concentrations into the proppant material as it is injected into the well bore in continuously or discretely varying time intervals or may include first injecting conductive proppant into the well bore followed by injecting non-conductive proppant (as examples). In an embodiment, the proppant may include both conductive and nonconductive proppant materials. For example, the first five, ten, or twenty percent of the proppant material that is provided into the well bore may be conductive proppant and the remaining ninety-five, ninety, or eighty percent of the proppant material that is provided into the well bore may be non-conductive proppant so that only the fracture (or only a leading portion of the fracture) may be filled with the conductive portion of the proppant material. It should be appreciated that these examples are merely illustrative and that in general any electromagnetically suitable proppant material can be provided.

Electric current source 112 situated on the Earth's surface 104 generates electric current that flows down the insulated wire 114 to the current injection point 116 proximate to geologic formation 106 and the proppant-filled first fracture portions 118 contained therein. As the injection point 114 is in direct physical contact with the well casing 108 and the proppant-filled first fracture portions 118, electric current can flow from injection point 116 to the conductive well casing 108 and the conductive proppant-filled fracture first portions 118. Current flow within well casing 108 is generally vertically upwards and downwards from injection point 116, whereas it is laterally outwards into geologic formation 106 within the proppant-filled first fracture portions 118. Electromagnetic fields 122 generated by the currents in both the well casing 108 and the proppant 119 propagate to various locations in a three-dimensional volume of Earth. In another embodiment, the electric current source may be located on or below the Earth's surface.

Electric currents associated with the electromagnetic waves 122 flow generally toward the current grounding point 124 situated on the Earth's surface 104. In another embodiment, grounding point 124 may be located on or slightly beneath the Earth's surface near to or far from the well bore 102. In another embodiment, grounding point 124 can be located beneath the surface 104 in another borehole that is relatively near to or far from the well and extraction system 100 and/or geologic formation system 106. The another borehole may or may not be used in the fracturing process. Grounding point 124 is connected to the electric current source 112 via the insulated wire 126. In this manner, the insulated wire 114, current injection device 116, well casing 108, proppant-filled fracture first :fracture portions 118, electromagnetic waves 122 propagating within the Earth, grounding device 124, and insulating wire 126 constitute a "closed loop" that carries electric current from and ultimately back to the electric current source 112. In an embodiment, the insulated wire 114 may be shielded.

One or more sensors, such as sensors 128, are positioned on the surface 104 of the Earth. In another embodiment, one or more sensors 128 may be positioned on, above or below the surface 104. Sensors 128 are used to detect electromagnetic fields such as the electromagnetic waves 122 that propagate from the energized well casing 108 and the proppant-filled fracture first portions 118 to the sensors 128. Sensors 128 include a transducer (not shown) for sensing an EM wave. The sensors 128 may include one or more antennas and receiver circuitry for transmitting, processing, digitizing, or otherwise handling electromagnetic field data.

Sensors 128 may be located at corresponding locations such as sensor locations L1 and L2. Sensors 128 may be deployed in a one-, two-, or three-dimensional distribution at or near surface 104. For example, sensors 128 may be positioned on surface 104, beneath surface 104 and/or suspended or mounted above surface 104. Additionally, sensors 128 may be deployed in various other subsurface boreholes located near to, or at some distance away from, the geologic formation06. In various embodiments, the optimal locations of sensors 128 for detecting electromagnetic fields can be determined through numerical modeling. Sensors 128 may include various types of physical transducers appropriate for detecting electric fields and/or magnetic fields, and converting these physical signals to voltage that are subsequently forwarded to the data recording system 130. In particular, sensors commonly used for geophysical exploration or characterization purposes (e.g., porous pots, metal electrodes, electric/magnetic pickup coils, antennas) may be used.

Sensors 128 are connected to the data recording system 130. The data recording system 130 has the capability to receive, amplify, filter, digitize, process, and otherwise handle the voltage signals generated by sensors 128 in response to the incident electromagnetic waves 122. Additionally, data recording system 130 may store these digitized and processed signals on an appropriate recording medium contained therein. Alternately, the data recording system 130 may transmit the received signals to computing equipment 132 where additional processing operations may be conducted and the data are stored therein. The computing equipment 132 may be located proximate to the data recording system 130, or it may be situated in a remote location. Transmission of data between the recording system 130 and computing equipment 132 may be via an electrical wire, or via radio-transmission techniques.

In certain embodiments, a sensor 128, a data recording system 130, and computing equipment 132 may be incorporated into a single physical package or unit capable of being deployed either on the Earth's surface 104, or within a subsurface borehole. In this manner, the separate functions of signal transduction, amplification, filtering, digitizing, processing, etc. and storage are contained within one physical device Computing equipment 132 may be used to store a geophysical/geological model representing the three-dimensional volume of the Earth supporting the propagating electromagnetic waves 122 (which includes the particular geologic formation 106 containing the fracture 117). It may also store data corresponding to the known location of the current injection point 116, as well as the known amplitude and waveform of the electric current generated by the current source 112. It may also store the known three-dimensional configuration of the well bore 102 with associated casing 108 and cement 110, and the known locations of the electromagnetic sensors 128. It may also store data corresponding to the locations of a number of Born scatterers in a subsurface volume of the Earth.

Computing equipment 132 may also store numerical algorithms appropriate for calculating various electromagnetic fields, including those incident on surface sensors 128 (as with the electromagnetic waves 122), incident on subsurface Born scattering locations, or scattered by these subsurface Born scatterers. Computing equipment 132 may also possess numerical algorithms and for receiving electromagnetic field data from sensors 128 and/or the recording system 130, adjusting the parameters of the First Born Approximation model of the subsurface using these received electromagnetic data, and determining the location and geometry of the proppant 119 within the fracture 118 using these adjusted parameters. Computing equipment 132 may be used to generate an image of the proppant-filled portions 118 of the fracture 117 using appropriate visualization software, by plotting in three-dimensional space the magnitudes of the Born scatterers. Computing equipment 132 may perform all suitable computing, analysis, numerical simulation, data processing, and visualization functions associated with a Born Scattering Inversion (BSI) procedure for imaging the proppant-filled portions 118 of fracture 117.

Sensors 128 may be used to gather electromagnetic field data before, during, and after the hydraulic fracturing and proppant injection operations. Equipment such as drilling and extraction equipment 134 for creating, reinforcing, pumping, extracting or other drilling and/or extraction operations may be present in the vicinity of the well bore 102. The locations of computing equipment 132 should be maintained during gathering of all electromagnetic field data by sensors 128 so that electrically conductive equipment does not move or change operations, and thus undesirably alter the electromagnetic fields to be measured. In this way, changes in measured electromagnetic fields before and after the hydraulic fracturing and proppant insertion operations can be primarily or completely attributed to the presence of the proppant-pack 119 within the fracture, thereby increasing the likelihood that the First Born Approximation is applicable to the scattered electromagnetic fields.

It can therefore be ascertained that by electrically energizing the well casing 108 (via the current insertion device 116) to cause it to act as a source of electric current, an electromagnetic field can be induced and recorded by sensors 128 at the surface 104 of the Earth. These recordings, taken before and after fracturing and proppant insertion, can subsequently be used to adjust the parameters of a First Born Approximation model of the scattered electromagnetic field, and thereby indicate the location and geometry of the proppant-filled portion 118 of the fracture 117 within geologic formation 106. As used herein, the term "geometry" can refer to the size, shape, length, height, width, orientation, etc. portions of the proppant-filled portions 118 of the fracture 117. "Orientation" can refer to the orientation of at least a portion of the proppant-filled fracture 118 relative to the surface 104 or the well bore 102 in the subsurface. The term "location" can refer to the position of the fracture portion 118 relative to the surface 104, the well bore 102, and/or the current injection point 116.

Figure 2:
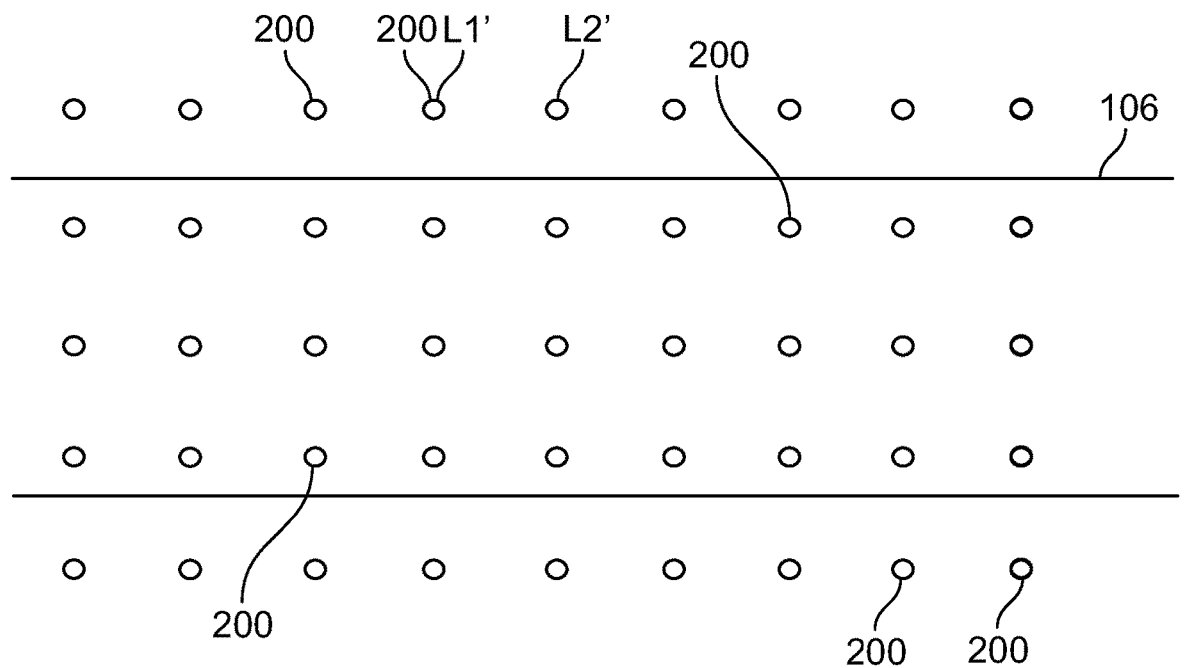
FIG. 2 is an exemplary diagram of a portion of the well system of FIG. 1 showing the locations of Born scatters in and around the geologic formation prior to a hydraulic fracturing operation in accordance with an embodiment.

With reference now to FIG. 2, a portion of geologic formation is shown prior to a hydraulic fracturing operation. As shown in FIG. 2, one or more Born scatterers 200 may be defined in a geophysical model of the Earth at various locations (e.g., scatterer locations L1', L2', etc.) in a volume of the Earth in and around the geologic formation 106. Scatterer locations such as locations L1' and L2' can be chosen based on a geophysical model of the geologic formation and any a priori knowledge of the intended fracturing operation. Scatterer locations can be chosen at any suitable number of locations in and around geologic formation 106. As examples, one scatterer location, two scatterer locations, more than two scatterer locations, ten scatterer locations, one hundred scatterer locations, one thousand scatterer locations, more than one thousand scatterer locations, tens of thousands of scatter locations, between a hundred and a thousand scatter locations or any other suitable number of scatterer locations can be chosen. At each scatterer location, a Born scatterer may be defined for use in the first Born approximation model.

In an electromagnetic field modeling operation using a first Born approximation model such as a Born Scattering Inversion operation, a geophysical model of the volume of the Earth in the location of the well bore, geologic formation and fracture is used to calculate primary electromagnetic fields (sometimes referred to herein as incident electromagnetic fields) at the scatterer locations. In an embodiment, the geophysical model may include the location of the well casing and electricity source. In a first modeling run, the Born scatterers are considered to be receivers of the primary electromagnetic fields.

According to the FBA model, a perturbation in the electromagnetic properties of the Earth at the locations of the Born scatterers will generate secondary electromagnetic fields (sometimes referred to herein as scattered electromagnetic fields). Because electromagnetically suitable proppant is provided in a fracture, a fracture can be modeled as a perturbation in the electromagnetic properties of some of the Born scatterers.

Figure 3:
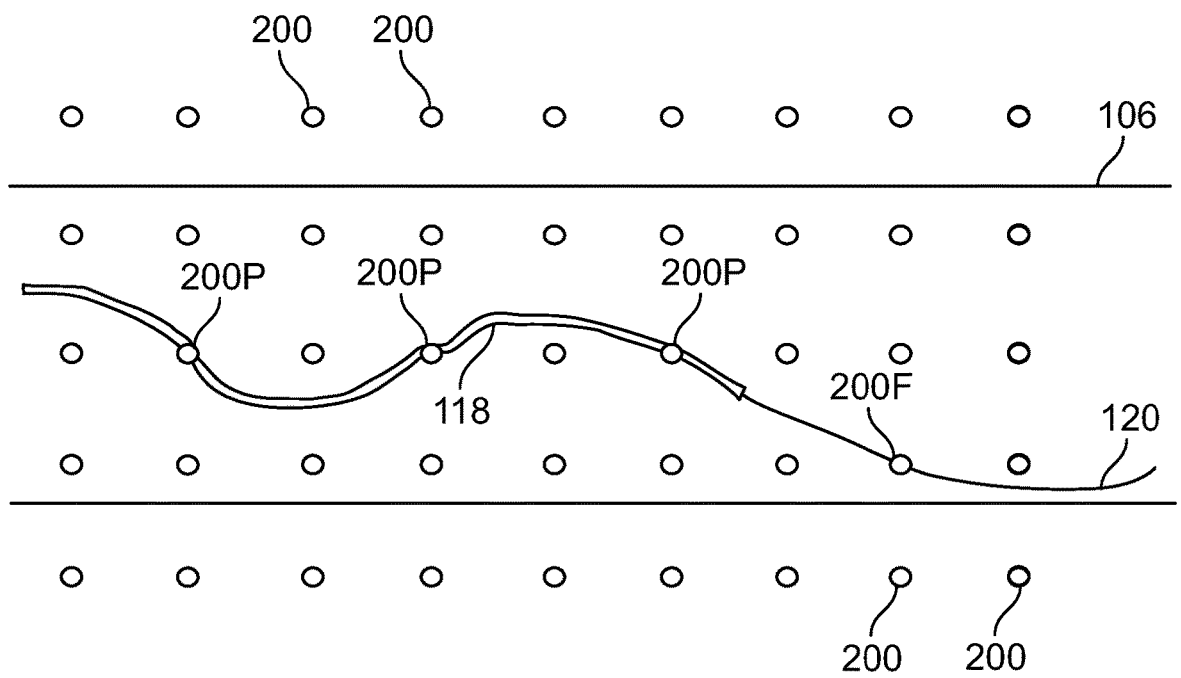
FIG. 3 is an exemplary diagram of a portion of the well system of FIG. 1 showing the locations of the same Born scatters (as in FIG. 2) in and around the geologic formation following a hydraulic fracturing operation in accordance with an embodiment.

As shown in FIG. 3, when a fracture 117 is induced in the geologic formation, the fracture 117 may pass through some of the scatterer locations 200. Scatter locations 200 include scatter locations in the proppant filled fracture 200P and scatter locations outside of the proppant filled fracture 200F. Proppant having electromagnetic properties (e.g., electric permittivity, magnetic permeability, and/or current conductivity) that are different from the corresponding properties of the geologic formation may be located at the locations of those scatterers 200P.

The EM properties at scatterer locations 200P will change significantly after the introduction of proppant into the fracture. However, the EM properties at scatterers 200F (located at the fracture, but away from the proppant) and at scatterers 200 (located away from the fracture), will change less than the change of the properties at scatterers 200P, or may not change at all.

As described above in connection with FIG. 1, the first Born approximation is an approximation in which the scattered electromagnetic field is proportional to the change in the electromagnetic properties at the Born scatterers and the incident electromagnetic fields on those Born scattering locations.

Therefore, given the primary (or incident) electromagnetic fields at the locations of the Born scatterers and an initial estimate of the electromagnetic properties of the material at those locations (represented, for example, by a set of initial values of the adjustable parameters), secondary (or scattered) electromagnetic fields generated by the Born scatterers in response to the primary electromagnetic fields can be calculated. Secondary electromagnetic fields at the locations of sensors 128 can be generated by, for example, summing the contribution of all Born scatterers in and around the geologic formation 106.

Two sets of measured electromagnetic field data from the sensors are acquired (e.g., before and after a hydraulic fracturing operation) for comparison to the calculated scattered fields. The difference in the measured electromagnetic field data from the two measurements may be attributable solely or primarily to the presence of the proppant-filled fracture. The difference in the measured electromagnetic field data can therefore be used to adjust the calculated scattered electromagnetic field by adjusting parameters corresponding to the electromagnetic properties of the Born scatterers.

Measured (observed) electromagnetic field data gathered at a particular time t may include a measured voltage difference $\Delta V(x_s,t)$ and/or time-derivative of magnetic induction $\delta b(x_s,t)/\delta t$, observed at a set of sensor locations $x_s$ (e.g., a three-dimensional position vector representing a sensor location such as one of sensor locations L1 or L2 of FIG. 1), from which an electric field vector $em(x_s,t)$ and/or a measured magnetic field vector $h_m(x_s,t)$ may be determined or inferred.

Calculated primary (or incident) electromagnetic field data may include a calculated primary electric field vector $e_p(x_B,t)$, a magnetic field vector $h_p(x_B,t)$, or both, computed at a set of Born scatterer locations $x_B$ (e.g., a three-dimensional position vector representing a scatterer location such as one of scatterer locations L1' or L2' of FIG. 2).

Calculated secondary (or scattered) electromagnetic field data may include an electric field vector $\delta e_p,t(x_S,t)$, a magnetic field vector $\delta h_p(x_S,t)$, or both, computed at the set of sensor locations $x_s$ (e.g., a three-dimensional position vector representing a sensor location such as locations L1 or L2 of FIG. 1). The secondary electromagnetic field data are determined by computing effective EM body sources at each scatterer location $x_B$, using the primary electric fields $e_p(x_B,t)$, magnetic fields $h_p(x_B,t)$, or both and a set of adjustable parameters representing the change in the electromagnetic properties of the Born scatterer at that scatterer location $x_B$.

The effective body sources and the set of adjustable parameters may be used to compute the secondary electromagnetic fields by inserting the effective body sources and the set of adjustable parameters into any suitable EM forward modeling algorithm modified for the First Born Approximation. Suitable forward modeling algorithms may include the well-known "EH" system of partial differential electromagnetic wave equations, solved via explicit time-domain finite-difference techniques, or any other appropriate numerical solution methodology. Other suitable forward modeling algorithms may include Green function or potential formulations, appropriately modified for the FBA.

The set of adjustable parameters may include a change in current conductivity $\delta\sigma(x_B)$, a change in electric permittivity $\delta\varepsilon(x_B)$, and/or a change in magnetic permeability $\delta\mu(x_B)$ at each scatterer location $x_B$ or a change in all three or any combination of these parameters.

The effective body sources may include a current density vector $\delta j(x_B,t)$, a magnetic induction vector $\delta b(x_B,t)$, and/or an electric displacement vector $\delta d(x_B,t)$ at each scatterer location $x_B$. In the FBA model, the effective body sources (and therefore the secondary electromagnetic fields generated by the effective body sources) are proportional to the incident electromagnetic field. For example, in the FBA model, the current density vector $\delta j(x_B,t)$ is the product of the incident electric field and the change in the current conductivity (e.g., $\delta j(x_B,t)=\delta\sigma(x_B) e_p(x_B,t)$), the magnetic induction vector $\delta b(x_B,t)$ is the product of the incident magnetic field and the change in the permeability (e.g., $\delta b(x_B,t)=\delta\mu(x_B) h_p(x_B,t)$), and the displacement vector $\delta d(x_B,t)$ is the product of the incident electric field and the change in the permittivity (e.g., $\delta d(x_B,t)=\delta\varepsilon(x_B) e_p(x_B,t)$).

Because the electromagnetic properties of the Earth at some of the Born scatterer locations change after insertion of proppant into the fracture, the secondary (or scattered) electromagnetic fields, once computed, can be adjusted to match the change in the electromagnetic fields observed at the sensor locations. This may be accomplished by modifying the adjustable parameters in a First Born Approximation model of the secondary (or scattered) electromagnetic fields by, for example, a linear estimation of the adjustable parameters that produce the best fit to the observed change in electromagnetic fields.

During a field data acquisition operation, electromagnetic energy sources and sensors in both recording measurements may occupy the same positions. Recording conditions (e.g., electromagnetic energy source magnitudes, waveforms, and orientations; electromagnetic receiver sensitivities and orientations, recording system amplifiers, filters and sampling characteristics, etc.) may also be maintained as closely as possible between the two data collections.

In some circumstances, the sensors may be moved from a first set of sensor locations to a second set of sensor locations for the gathering of electromagnetic field data before the fracturing operation and after the proppant has been provided into a fracture. In these circumstances, mathematical methods may be used to translate, rotate, interpolate, or otherwise determine measured and/or modeled electromagnetic :fields at the first and/or second sets of sensor locations or to estimate measured and/or modeled electromagnetic fields at one of the first or second sets of sensor locations based on determined modeled and/or measured electromagnetic fields at the other of the first and/or second sets of sensor locations. However, this is merely illustrative. In various embodiments, the sensor locations remain the same for all measurements of electromagnetic fields and all determinations of modeled electromagnetic fields in order to reduce the computational burden of the modeling operation and to help ensure that the change in the electromagnetic fields is primarily due to the introduction of the proppant.

In some embodiments, a contribution to the secondary electromagnetic fields from each Born scatterer may be individually computed in a separate modeling run. However, this is merely illustrative. In some embodiments, contributions to the secondary electromagnetic fields from each of several groups of Born scatterers may be computed in a corresponding modeling run. In one embodiment, the contribution of all of the Born scatterers may be computed in a single modeling run. The total secondary electromagnetic field at each sensor location is the sum of the contributions of each Born scatterer.

The examples of FIGS. 2 and 3 are cross-sectional diagrammatic views. However, it should be appreciated that Born scatterers 200 can be distributed in a three-dimensional manner in the volume of Earth in and around the geologic formation.

Figure 4:
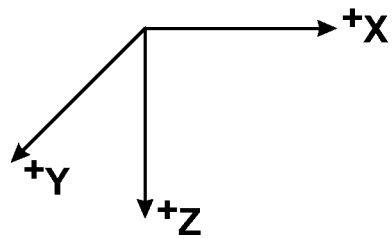
FIG. 4 is an exemplary diagram of a set of Born scatterers that are arranged in a three-dimensional grid in accordance with an embodiment.
Figure 4:
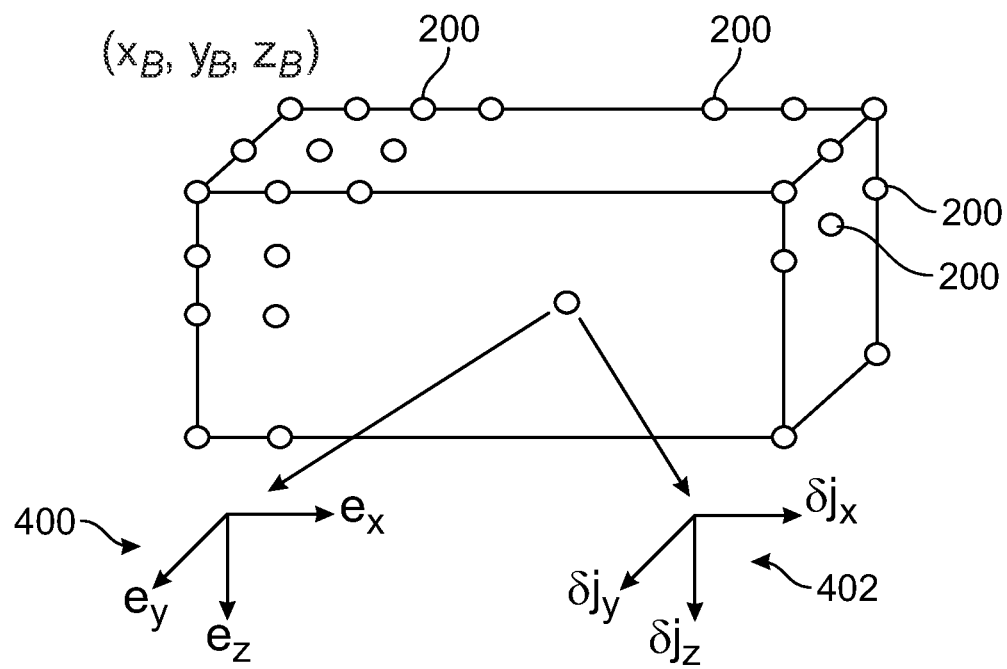

FIG. 4 shows an example of a three-dimensional distribution of Born scatterers. In the example of FIG. 4 Born scatterers 200 are distributed in a regular three-dimensional grid in a given volume at scatterer locations $(x_B, y_B, z_B)$, sometimes collectively referred to as a vector XB. However, this is merely illustrative. Born scatterers may be distributed in any suitable pattern for modeling the location of proppant and/or imaging the proppant in a fracture in, for example, a Born Scattering Inversion operation. The volume within which scatterers 200 are located may be chosen to include a volume of the Earth that includes at least a portion of a geologic formation in which a fracture has been or will be induced.

As shown in FIG. 4, for a particular Born scatterer, an incident (primary) electric field vector 400 (e.g., $e_p = [e_x, e_y, e_z]$) in the coordinate system of FIG. 4) may be computed in, for example, a first modeling run. In a second modeling run, a current density 402 (e.g., $\delta j_p = [\delta j_x, \delta j_y, \delta j_z]$) may be computed. The current density 402 may be used to compute a scattered (secondary) electric field at the location of one or more of sensors 128 of FIG. 1.

Figure 5:
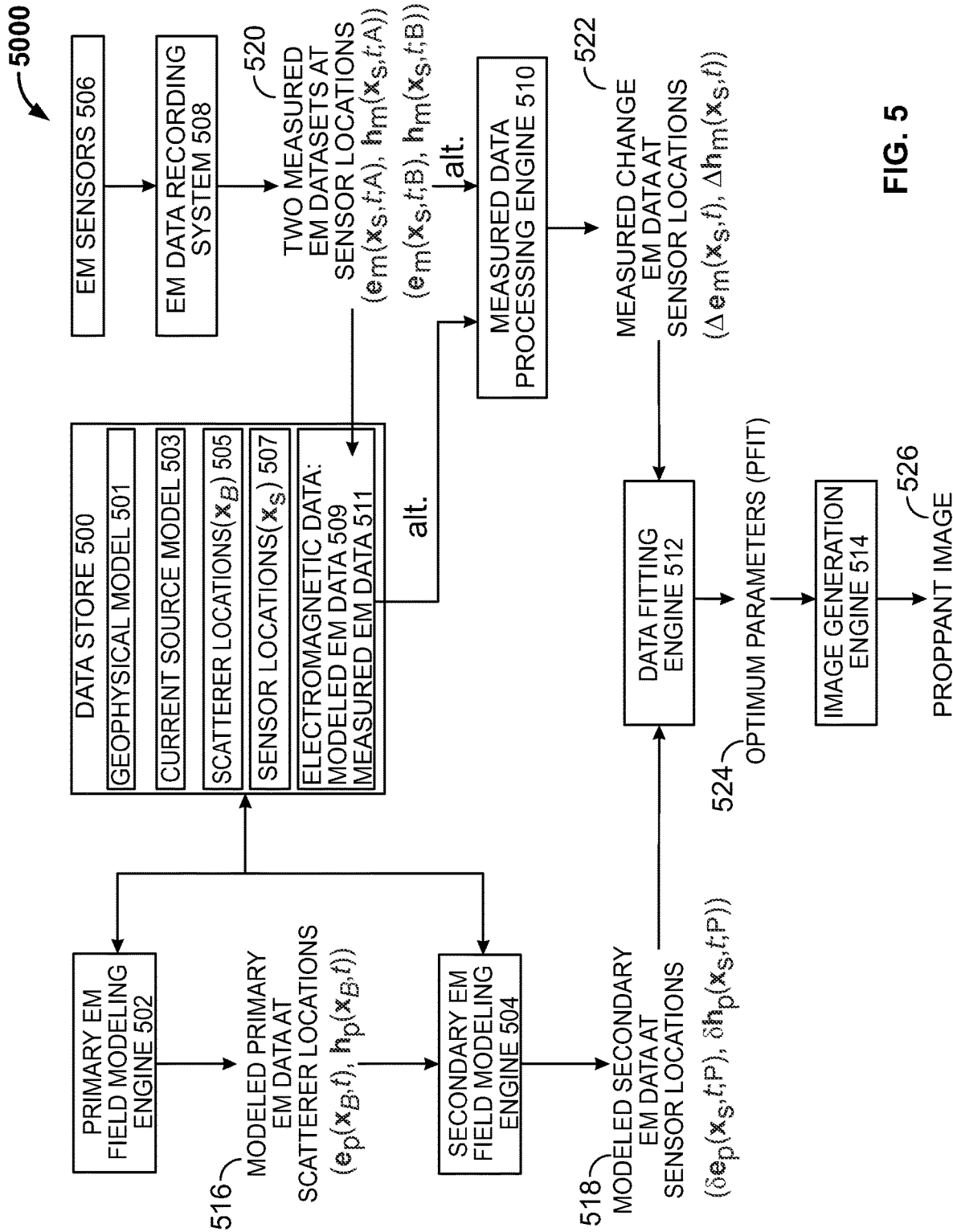
FIG. 5 is a functional block diagram of an exemplary system that facilitates computing a location and an image of a proppant in a fracture in a geologic formation beneath the surface of the Earth showing how data may be transferred and computed by the system in accordance with an embodiment.

With reference now to FIG. 5, an embodiment of a data flow and computation system 5000 is shown for determining the location of proppant and/or imaging the proppant in a fracture in a geologic formation. As shown in FIG. 5, the system 5000 includes a data store 500, a primary field modeling engine 502, a secondary field modeling engine 504, a measured data processing engine 510, a data fitting engine 512, and an image generation engine 514.

Data store 500, primary field modeling engine 502, secondary field modeling engine 504, measured data processing engine 510, data fitting engine 512, and image generation engine 514 may be implemented on common computing equipment or one or more separate installations of computing equipment. In one embodiment, primary field modeling engine 502, secondary field modeling engine 504, and some or all of data store 500 may be located remotely from a drill site at which a well bore is located, and measured data processing engine 510, data fitting engine 512, and image generation engine 514 may be located at the drill site (e.g., incorporated into computing equipment 132 depicted in FIG. 1). However, this is merely illustrative. In various embodiments, data store 500, primary field modeling engine 502, secondary field modeling engine 504, measured data processing engine 510, data fitting engine 512, and image generation engine 514 may be included in computing equipment 132 (see FIG. 1), or implemented on any suitable computing equipment, near to or remote from the drill site.

As shown in FIG. 5, primary field modeling engine 502 and secondary field modeling engine 504 may be communicatively coupled to data store 500. If desired, other portions of system of FIG. 5 may also be communicatively coupled to data store 500. For example, primary field modeling engine 502, secondary field modeling engine 504, and/or any other portion of the system of FIG. 5 may have read and/or write access to memory and information stored on data store 500.

Data store 500 may be used to store a geophysical model 501, an electric current source model 503, one or more Born scatterer locations 505, one or more sensor types and locations 507, modeled and/or measured electromagnetic field data 509 and 511, or other pertinent information, data, numerical algorithms, and/or computer-readable instructions for use in the system of FIG. 5.

Geophysical model 501 may include stored data that describes the three-dimensional size, shape, and location of physical structures such as geologic formations, the Earth's surface, the well bore, the well casing, layers of rock, soil, and/or water between the fractured geologic formation 106 of FIG. 1 and the surface, drilling and extraction equipment at the drill site, other physical structures and the electromagnetic properties (e.g., conductivity, permeability, permittivity, etc.) of these structures.

Electromagnetic (EM) data stored on data store 500 may include modeled (i.e., calculated) EM data 509 and/or measured EM data 511. Measured EM data 511 may be provided to data store 500 from the EM data recording system 508, which may be physically located near the well site, as illustrated in FIG. 1. In addition to modeled and measured data, the data store 500 may hold executable code representing a First Born Approximation modeling process having a set of adjustable parameters P (e.g., a conductivity change parameter $\delta\sigma(x_B)$, a permittivity change parameter $\delta\varepsilon(x_B)$, and/or a permeability change parameter $\delta\mu(x_B)$ at each scatterer location $x_B$).

When executed by one or more processors using geophysical model 501, electric current source model 503, scatterer locations 505, and sensor locations 507, an electromagnetic forward modeling engine may provide calculated (or modeled) electromagnetic field values as functions of time t at selected locations. Electromagnetic field values may be computed by primary field modeling engine 502 and/or the secondary field modeling engine 504 using any suitable numerical modeling approach (e.g., a finite-differences process, a finite-elements process, a discontinuous Galerkin process, a Green function process, a layered media propagator process, or any other suitable numerical computation process).

Primary field modeling engine 502 is used to calculate primary electromagnetic (EM) field data 516 (e.g., primary or incident electromagnetic field values) at one or more Born scattering locations $x_B$ within a volume of the Earth that includes at least a portion of the geologic formation to be fractured. Modeled primary field data 516 may include a predicted primary electric field $e_p(x_B,t)$ and/or a predicted primary magnetic field $h_p(x_B,t)$, as functions of time t at scatterer locations $x_B$. Modeled primary field data 516 may be computed using geophysical model 501, electric current source model 503, and scatterer locations 505 stored in data store 500.

Secondary field modeling engine 504 is used to calculate secondary electromagnetic (EM) field data 518 (e.g., secondary or scattered electromagnetic field values) at one or more sensor locations $x_B$ distributed on the Earth's surface (as with sensors 128 in FIG. 1) or within the Earth's subsurface. Modeled secondary field data 518 may include a predicted secondary electric field vector $\delta e_p(x_s,t;P)$ and/or a predicted magnetic field vector $\delta h_p(x_s,t;P)$ as functions of time t at sensor locations $x_s$. These modeled secondary electromagnetic fields are also functions of adjustable parameters P related to the strengths of the Born scattering sources. Modeled secondary field data 518 may be computed using geophysical model 501, electric current source model 503, scatterer locations 505, and sensor locations 507, and stored in data store 500.

Sensor locations 505 utilized by the primary and secondary field modeling engines represent locations L1 and L2 of sensors 128 illustrated in FIG. 1, and which also correspond to the locations of EM sensors 506 in FIG. 5. These sensors are used to measure electromagnetic (EM) field data before and after hydraulic fracturing and proppant insertion operations.

EM sensors 506 forward measured data to the EM data recording system 508 where these data are stored on appropriate recording media. For example, EM sensors 506 are used to gather electromagnetic field data prior to a hydraulic fracturing and proppant insertion, and to gather electromagnetic field data after hydraulic fracturing and proppant insertion. These two measured EM datasets are referenced by letters A and B in FIG. 5, which may stand for EM data measured after and before fracturing and proppant insertion, respectively. Measured data may include an electric field vector $e_m(x_s,t;A$ and $B)$ and/or a magnetic field vector $h_m(x_s,t;A$ and $B)$ observed at sensor locations $x_s$, and are collectively referred to as two measured EM datasets at sensor locations 520. The two sets of measured EM data may be different due primarily or completely to the addition of proppant-filled fractures in geologic formation 106 (of FIG. 1).

The two measured EM datasets at sensor locations 520 (referenced by letters A and B) are provided to measured data processing engine 510. Measured data processing engine 510 may receive these datasets via two alternate routes or pathways. In the first instance, EM data recording system 508 forwards these data directly to measured data processing engine 510 in real time or near-real time as the EM data are measured. I tithe second instance, EM data recording engine 508 forwards these data to data store 500, where they are held in computational memory as measured EM data 511 for later access by the measured data processing engine 510.

Measured data processing engine 510 may be used to perform various signal processing operations on the two measured EM data sets A and B in order to enhance signal quality, suppress noise, etc. Measured data processing engine 506 is then used to generate measured change EM data at sensor locations 522, based on the two measured EM datasets at sensor locations 520 (referenced by A and B). The measured change EM data 522 may, for example, include a difference (i.e., a subtraction) of datasets A and B. The measured change data may include an electric vector $\Delta e_m(x_s,t)$ and/or a magnetic vector $\Delta h_m(x_s,t)$. The measured change EM data at sensor locations 522 represents the scattered portion of the measured electromagnetic field data 520 generated by the presence of proppant in the fracture.

Modeled secondary EM data at sensor locations 518 (e.g., calculated secondary electromagnetic field data at the sensor locations 506 based on an FBA modeling approach) and measured change EM data at sensor locations 522 (e.g., measured scattered electromagnetic field data at the sensor locations 506) are provided to the data fitting engine 512. Because modeled secondary EM data 518 is generated using an initial set of adjustable parameters P that have not been informed by any measured information about a proppant-filled fracture, the modeled secondary EM data 518 and the measured change EM data 522 may be different.

Data fitting engine 512 is used to adjust the adjustable parameters (e.g., a set of parameters P corresponding to electromagnetic properties of material at the Born scatterer locations $x_B$) until the modeled secondary EM data at sensor locations 518 has been modified to match the measured change EM data at sensor locations 522 to within a predetermined or actively determined range. In one embodiment, a weighted least squares difference may be used to quantify the degree of misfit between modeled data 518 and measured data 522. The particular set of parameters PFIT that minimizes the weighted least squares difference may be solved for using well known procedures from linear algebra. However, this is merely illustrative. In various other embodiments, any suitable data fitting procedure may be used to adjust the set of adjustable parameters P until an adequate fit between the modeled secondary EM data 518 and the measured change EM data 522 is obtained. The particular set of parameters that provides the best fit (i.e., the minimum misfit) constitutes the optimum parameters PFIT.

The optimum set of adjustable parameters 524 (i.e., fitted parameter set PFIT) that results in the modeled secondary EM data 518 that best matches the measured change EM data 522 may be provided to image generation engine 514. Image generation engine 514 may use the optimum parameters 524 to determine the location of proppant within a fracture and/or to generate a two or three-dimensional image 526 of the proppant pack. Because the adjustable parameters (P) each are proportional to the amount of change in an electromagnetic property of the material at a Born scatterer location, the values of the optimum parameters (PFIT) themselves can be used to construct a proppant image 526. The scatterer locations $x_B$ serve as effective image pixel (in two-dimensions) or voxel (in three-dimensions) coordinates. However, this is merely illustrative. In various embodiments, image generation engine 514 may perform image processing operations such as scaling, enhancement, smoothing, filtering or other image processing operations to form the proppant image 526.

Image 526 may be generated in near-real time immediately after a hydraulic fracturing operation to provide a drilling manager or team with a three-dimensional image of the proppant inserted into the fracture. This image can then be immediately used to guide further fracturing and proppant-insertion operations.

Figure 6:
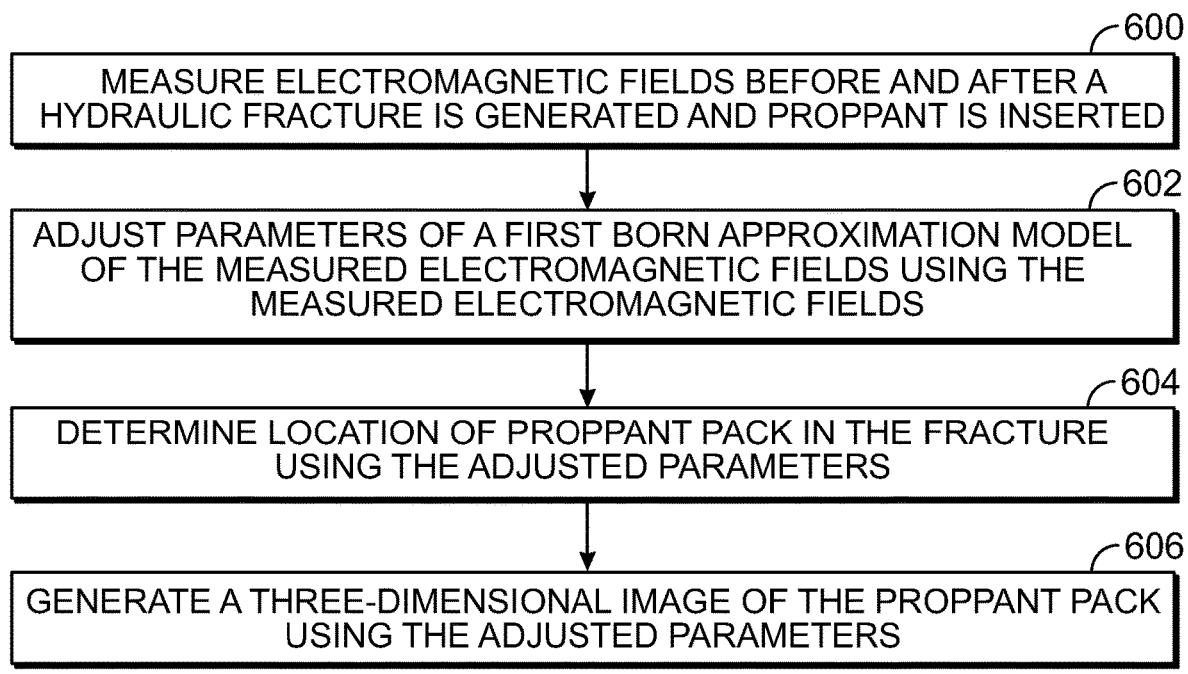
FIG. 6 is a flow diagram that illustrates an exemplary process for computing a location, length, orientation and/or image of proppant within a fracture in a geologic formation beneath the surface of the Earth in accordance with an embodiment.

FIG. 6 illustrates operations that may be performed by computing equipment, such as described above in connection with FIGS. 1 and 5, to model a hydraulic fracture in a geologic formation are shown in FIG. 6.

At block 600 electromagnetic fields in the vicinity of a hydraulic fracture before and after the fracture is generated may be measured. The hydraulic fracture may include a proppant material having electromagnetic properties configured to enhance the detectability of the surface electromagnetic fields. Surface electromagnetic fields may also be measured during a hydraulic fracturing operation to create the hydraulic fracture. The hydraulic fracture may be generated in a geologic formation in a volume of the Earth.

At block 602, the parameters of an FBA model of the surface electromagnetic fields may be adjusted using the measured surface electromagnetic fields. The parameters may be adjusted by computing a difference between the measured surface electromagnetic fields before and after the fracture is generated, comparing modeled electromagnetic fields computed using the first Born approximation model to the measured surface electromagnetic fields, and adjusting the parameters based on the comparison. The parameters may each correspond to a change in an electromagnetic property of a material such as rock or proppant at the location of a Born scatterer.

At block 604, the location of proppant such as a proppant pack in the fracture may be determined using the adjusted parameters. The size, shape, and orientation of the proppant pack within a fracture formation may also be determined using the adjusted parameters.

At block 606, an image such as a three-dimensional image of the proppant pack may be generated using the adjusted parameters.

Figure 7:
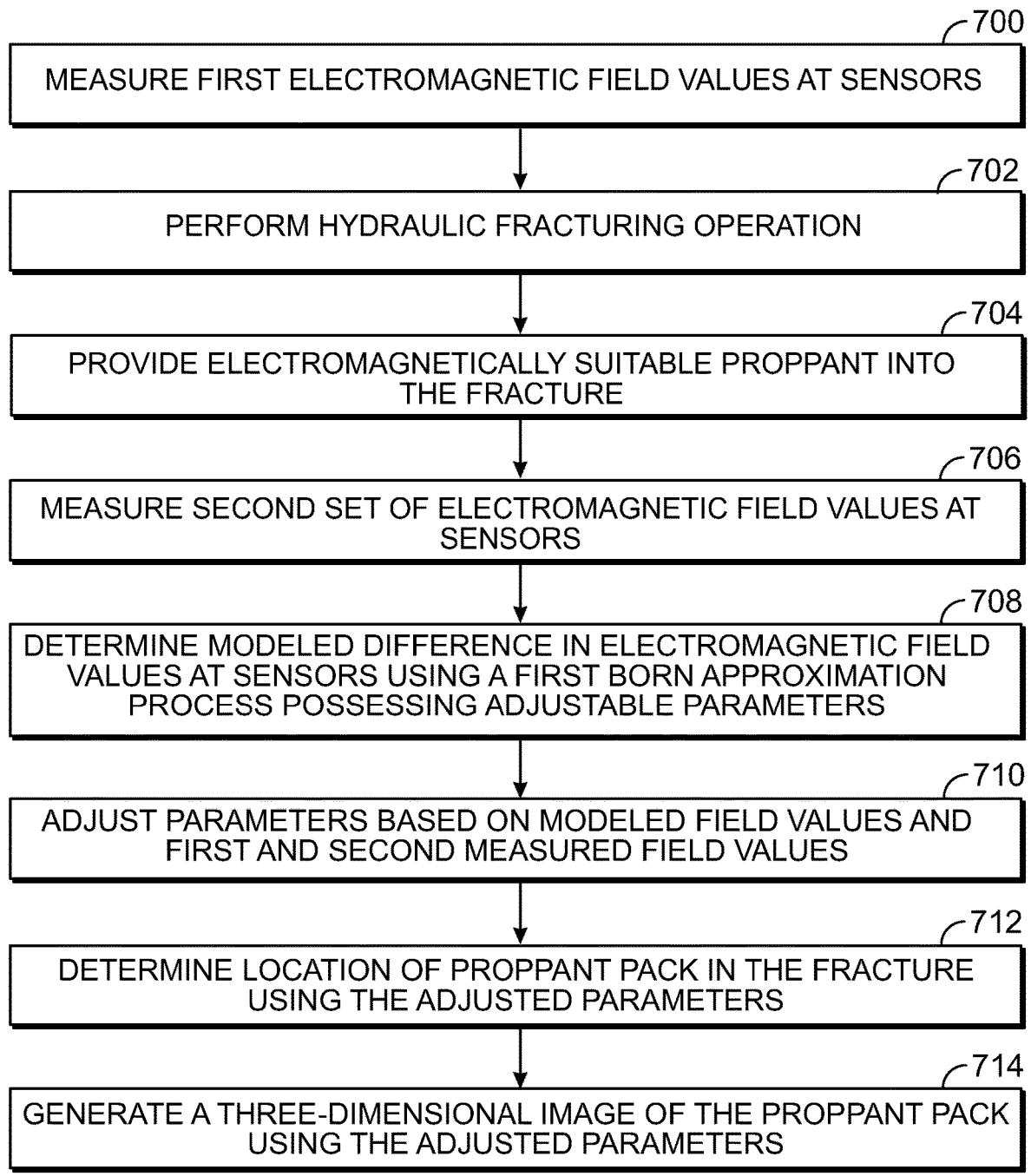
FIG. 7 is a flow diagram that illustrates further details of the exemplary process of FIG. 6 in accordance with an embodiment.

Further details of operations that may be performed for modeling a hydraulic fracture in a geologic formation are shown in FIG. 7.

At step 700, first measured electromagnetic field values are gathered using a plurality of sensors. The plurality of sensors may be located at or near the surface of the Earth as described above in connection with, for example, FIG. 1. Additionally, sensors may be deployed in boreholes in the subsurface of the Earth.

At step 702, a hydraulic fracturing operation is performed.

At step 704, an electromagnetically suitable proppant pack is provided into the fracture generated by the hydraulic fracturing operation. The proppant pack may partially or completely fill the fracture. The proppant material may have an electric permittivity, a magnetic permeability, a current conductivity and/or another electromagnetic property that is different from the corresponding property of the surrounding geologic formation. The proppant may be provided such that the proppant pack is coupled to a well casing used in the hydraulic fracturing operation and receives electric current from an electricity source affixed to the well casing.

At step 706, second measured electromagnetic field values are gathered using the same plurality of sensors.

At step 708, the change in electromagnetic field values observed at the sensor locations is modeled using a First Born Approximation (FBA) process having adjustable parameters. The adjustable parameters correspond to changes in the electromagnetic properties of a set of Born scatterers in the FBA model.

At step 710, the parameters of the First Born Approximation model are adjusted based on the modeled change field values, and the first and second measured field values. For example, the modeled (i.e., predicted) change field values may be adjusted to minimize the difference between the modeled change field values and the measured change field values (i.e., the difference between the first and second measured field values) by adjusting the FBA model parameters.

At step 712, the location of the proppant pack may be determined based on the adjusted parameters of the FBA model.

At step 714, an image such as a two- or three-dimensional image of the proppant pack may be generated using the adjusted parameters.

Figure 8A:
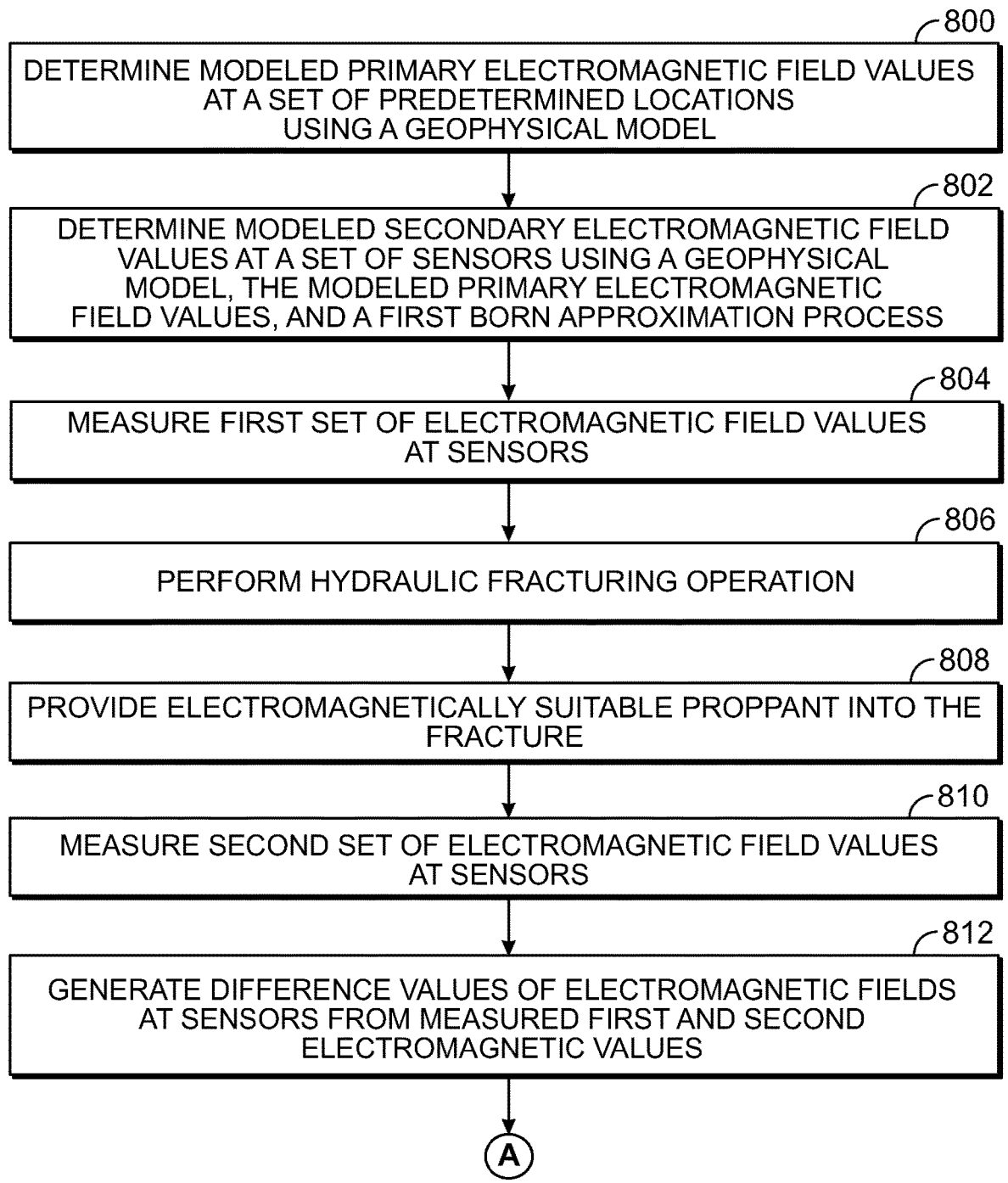
FIGS. 8A and 8B combine to show a flow diagram that illustrates further details of the exemplary process of FIG. 7 in accordance with an embodiment.
Figure 8B:
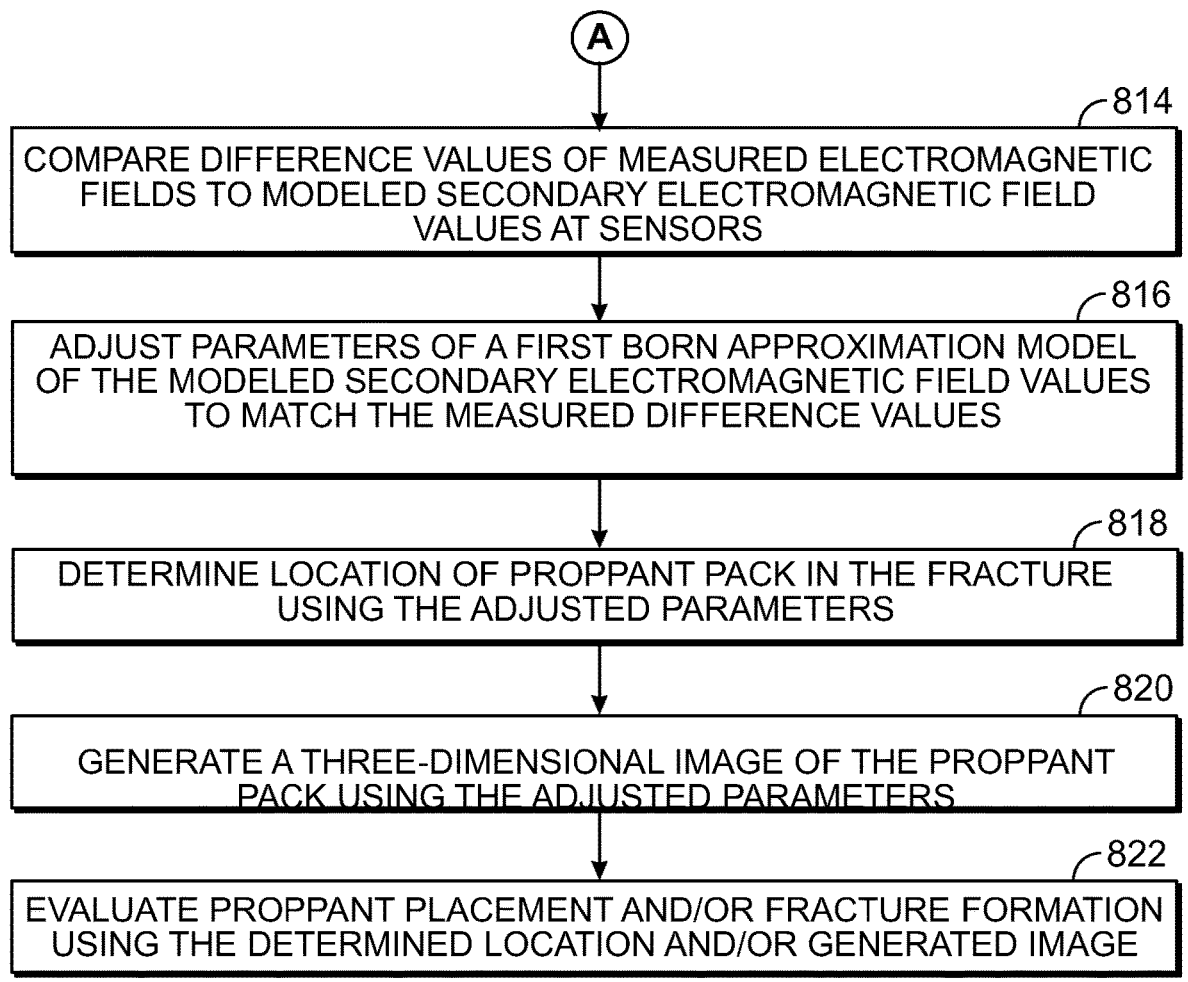

Still further details of operations that may be performed for modeling electromagnetic fields scattered by a proppant-filled hydraulic fracture in a geologic formation, and forming a three-dimensional image of that fracture, are shown in FIG. 8.

At step 800, modeled primary (or incident) electric and/or magnetic field values at a set of predetermined locations in a volume of the Earth are determined using a geophysical model. The geophysical model may include a geologic formation that is located at least partially within the volume, other layers of the Earth, the Earth's surface, a well bore, a well casing, and/or other geophysical and geological features within the volume. The set of predetermined locations may be locations within or near the geologic formation at which corresponding Born scattering sources have been defined in a First Born Approximation (FBA) modeling approach.

At step 802, modeled secondary (or scattered) electric and/or magnetic field values at the locations of a set of sensors are determined using the geophysical model, the modeled primary electromagnetic field values at the set of predetermined locations, and a First Born Approximation modeling process with adjustable parameters.

At step 804, measured first electric and/or magnetic field values are gathered using a plurality of sensors.

At step 806, after the first measured electric and/or magnetic field values have been gathered, a hydraulic fracturing operation is performed. The hydraulic fracturing operation may be performed in a portion of the geologic formation within the volume.

At step 808, an electromagnetically suitable proppant pack is provided into the fracture generated by the hydraulic fracturing operation.

At step 810, following the providing of the proppant into the fracture, second measured electric and/or magnetic field values are gathered using the plurality of sensors.

At step 812, difference values may be generated from the first and second measured electric and/or magnetic field values. The difference values may be determined by, for example, subtracting the second measured values from the first measured values at each sensor. However, this is merely illustrative. In various embodiments, other differencing, correlation, or comparison techniques may be used to determine a change in the second measured electromagnetic fields with respect to the first measured electromagnetic fields.

At step 814, the measured difference values are compared to the modeled secondary electric and/or magnetic field values from step 802. Comparing the difference values to the modeled secondary electric and/or magnetic field values may include determining an additional difference between the measured difference values and the modeled secondary electric and/or magnetic field values for each sensor, computing a sum of the squares of these additional differences, computing a weighted sum of the squares of these additional differences, computing a sum of absolute values of these additional differences, or otherwise quantitatively comparing these additional differences.

At step 816, adjustable parameters of a First Born Approximation (FBA) model may be adjusted based on the previous comparison 814 of the measured difference values and the modeled secondary electric and/or magnetic field values. Adjusting the parameters may include modifying some or all of the parameters from initial values in order to modify the modeled secondary (or scattered) electric and/or magnetic fields to match the measured difference values to within a given tolerance. For example, the parameters may be adjusted to minimize the weighted sum of the squares of the differences between the measured difference values and the modeled secondary electric and/or magnetic field values for each sensor. Adjusting the parameters may change the contribution of each of the Born scattering sources to the modeled secondary electric and/or magnetic fields by adjusting the corresponding contrast in one or more electromagnetic material properties at the location of each Born scattering source.

At step 818, the location, size, shape, orientation or other properties of the proppant pack in the fracture may be determined based on the adjusted parameters.

At step 820, an image such as a two or three-dimensional image of the proppant pack may be generated using the adjusted parameters. The image may be amplitude-calibrated (e.g., using a color plotting scheme) to distinguish the spatially-variable Born scattering strengths represented by the adjusted parameters.

At step 822, the fracture formation and/or the proppant placement resulting from the hydraulic fracturing operation may be evaluated using the determined location, size, shape, orientation, and/or the image of the proppant pack.

Figure 9:
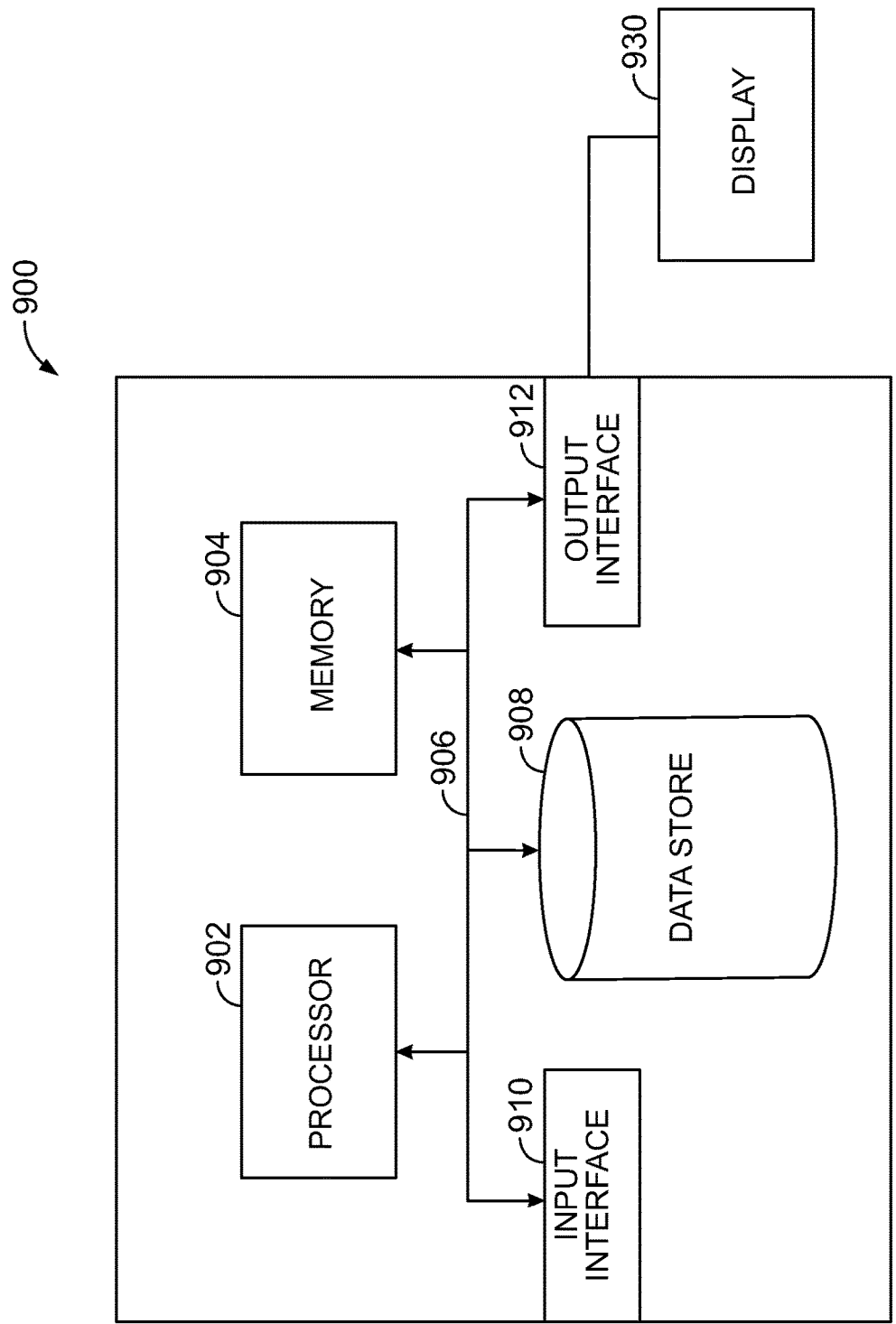
FIG. 9 is an exemplary computing system in accordance with an embodiment.

Now referring to FIG. 9, a high-level illustration of an exemplary computing device 900 that can be used in accordance with the systems and methodologies disclosed herein is illustrated. For instance, the computing device 900 may be used in a system that supports computing estimates of electromagnetic fields induced by an energized well casing and proppant-filled fracture in a well system using a first Born approximation model. In another example, at least a portion of the computing device 900 may be used in a system that supports estimating a size, location, length, orientation, and/or image of proppant within an induced fracture in a geologic formation beneath the surface of the Earth. The computing device 900 includes at least one processor 902 that executes instructions that are stored in a memory 904. The memory 904 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store computer-implemented models of well casing(s) and/or fracture(s), values indicative of an amount of electric current applied to a well casing, values indicative of a location on a well casing where electric current is applied, sensor locations, scatterer locations, a first Born approximation model having adjustable parameters, etc.

The computing device 900 additionally includes a data store 908 that is accessible by the processor 902 by way of the system bus 906. The data store 908 may be or include any suitable computer-readable storage, including a hard disk, memory, etc. The data store 908 may include executable instructions, computer-implemented models, etc. The computing device 900 also includes an input interface 910 that allows external devices to communicate with the computing device 900. For instance, the input interface 910 may be used to receive instructions from an external computer device, a user, etc. The computing device 900 also includes an output interface 912 that interfaces the computing device 900 with one or more external devices. For example, the computing device 900 may display text, images, etc. on a display 930 by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

In accordance with an embodiment, a system is provided that includes a database that stores: a geophysical model of a volume of Earth including a geologic formation and a well bore, a set of locations within the volume, an electromagnetic model, and a set of sensor locations; and a processor configured to: predict electromagnetic field values at the set of sensor locations using the electromagnetic model and the geophysical model, receive measured electromagnetic field data gathered at the set of sensor locations, and adjust, based on the measured electromagnetic field data, the predicted electromagnetic field values.

In accordance with another embodiment, the processor is further configured to determine a location of a proppant in a fracture in the geologic formation using the adjusted predicted electromagnetic field values.

In accordance with another embodiment, the processor is further configured to generate an image of the proppant using the adjusted predicted electromagnetic field values.

In accordance with another embodiment, the electromagnetic model includes a first Born approximation model having a plurality of Born scatterers at the set of locations within the volume.

In accordance with another embodiment, the processor is configured to predict the electromagnetic field values by computing primary electric field values at the set of locations within the volume and computing secondary electric field values at the set of sensor locations using the primary electric field values at the set of locations within the volume.

In accordance with another embodiment, the first Born approximation model includes a plurality of adjustable parameters each corresponding to an electromagnetic property of a material at one of the set of locations within the volume.

In accordance with another embodiment, the processor 1s configured to adjust the predicted electromagnetic field values by adjusting the plurality of adjustable parameters.

In accordance with another embodiment, the system further includes a plurality of sensors at the set of sensor locations and processor is configured to receive the measured electromagnetic field data from the plurality of sensors.

In accordance with another embodiment, the measured electromagnetic field data includes electromagnetic field data gathered before and after a hydraulic fracturing operation in the geologic formation using the well bore.

In accordance with another embodiment, the processor is configured to adjust the plurality of adjustable parameters such that the secondary electric field values at the set of sensor locations match a difference between the electromagnetic field data gathered before and after the hydraulic fracturing operation to within a predetermined range.

In accordance with an embodiment, a method is provided that includes determining a plurality of scattered electromagnetic field values using a model having adjustable parameters; performing a hydraulic fracturing operation to create a fracture in a geologic formation; providing an electromagnetically suitable proppant into the fracture; gathering, prior to the hydraulic fracturing operation, a plurality of measured electromagnetic field values at a first plurality of sensor locations; gathering, with the electromagnetically suitable proppant in the fracture, an additional plurality of measured electromagnetic field values at a second plurality of sensor locations; determining a difference between the plurality of measured electromagnetic field values and the additional plurality of measured electromagnetic field values; and modifying at least some of the adjustable parameters based on a comparison of the difference with the plurality of scattered electromagnetic field values.

In accordance with another embodiment, the model includes a first Born approximation model, the first plurality of sensor locations is the same as the second plurality of sensor locations, and determining the plurality of scattered electromagnetic field values using the model having the adjustable parameters includes determining a plurality of primary electromagnetic field values at a set of predetermined locations within a volume of Earth that at least partially includes a geologic formation and determining the plurality of scattered electromagnetic field values at the first plurality of sensor locations using the first Born approximation model and using the determined plurality of primary electromagnetic fields.

In accordance with another embodiment, the method further includes applying an electric current to a well bore that extends from a surface of the Earth to the geologic formation.

In accordance with another embodiment, modifying the at least some of the adjustable parameters based on the comparison of the plurality of scattered electromagnetic field values with the difference includes determining a set of adjusted parameters that minimize an additional difference between the difference and the determined plurality of scattered electromagnetic field values.

In accordance with another embodiment, the method further includes determining a location of the proppant within the fracture using the set of adjusted parameters and the set of predetermined locations within the volume.

In accordance with another embodiment, the first Born approximation model includes a plurality of Born scatterers, each located at one of the set of predetermined locations within the volume.

In accordance with another embodiment, the method further includes generating an image of the proppant within the fracture using the set of adjusted parameters and the set of predetermined locations within the volume.

In accordance with another embodiment, the image includes a three-dimensional image of the fracture.

In accordance with an embodiment, a system is provided that includes a conductive well casing in a well bore that extends from a surface of Earth to a geologic formation within the Earth; an electricity source conductively coupled to the conductive well casing; a proppant in a fracture in the geologic formation and conductively coupled to the well casing; a plurality of sensors at a corresponding plurality of sensor locations, where the sensors are configured to gather electromagnetic field data generated when a current is applied to the conductive well casing using the electricity source; and computing equipment including: memory that stores a plurality of predicted electromagnetic field values at the plurality of sensor locations based on a first Born approximation model that includes a plurality of adjustable scaling factors; and a processor configured to receive the electromagnetic field data from the plurality of sensors, adjust the adjustable scaling factors based on the electromagnetic field data, and generate an image of the proppant using the adjusted adjustable scaling factors.

In accordance with another embodiment the adjustable scaling factors include scattering amplitudes of a corresponding plurality of Born scatterers.

It is noted that several examples have been provided for purposes of explanation. These examples are not to be construed as limiting the hereto-appended claims. Additionally, it may be recognized that the examples provided herein may be permutated while still falling under the scope of the claims.

We claim:
1. A system, comprising:
a casing placed within a well bore extending from Earth's surface to a subterranean geologic formation;
proppant and a conductive material;
an electric current source in electrical communication with at least a portion of the casing, at least a portion of the conductive material and a plurality of sensors at a set of sensor locations, wherein at least one sensor of the plurality of sensors is located at or near the Earth's surface;
a database that stores:
a geophysical model of a volume of Earth including the geologic formation and the well bore,
a set of locations within the volume,
an electromagnetic model, and
the set of sensor locations; and
a processor configured to:
predict electromagnetic field values at the set of sensor locations using the electromagnetic model and the geophysical model by:
computing primary electric and/or magnetic field values at the set of locations within the volume; and
computing secondary electric and/or magnetic field values at the set of sensor locations using the primary electric and/or magnetic field values at the set of locations within the volume, wherein computing the secondary electric and/or magnetic field values comprises inserting effective electromagnetic body sources comprising current density vector, magnetic induction vector, or electric displacement vector or combinations thereof into a system of partial differential electromagnetic wave equations,
receive measured electromagnetic field data gathered at the set of sensor locations,
adjust, based on the measured electromagnetic field data, the predicted electromagnetic field values,
determine a location of the proppant using the adjusted predicted electromagnetic field values, and
generate an image of the proppant using the adjusted predicted electromagnetic field values.

2. The system of claim 1, wherein the plurality of sensors comprises a first plurality of sensors configured to detect electric fields and a second plurality of sensors configured to detect magnetic fields.

3. The system of claim 1, wherein a numerical modeling methodology selected from the group consisting of finite-differences, finite elements, discontinuous Galerkin, Green functions, and layered media propagators and any combination thereof is used to compute the primary electric and/or magnetic field values at the set of locations within the volume.

4. The system of claim 1, wherein the electromagnetic model comprises a Born approximation model having a plurality of Born scatterers at the set of locations within the volume.

5. The system of claim 4, wherein the Born approximation model comprises a plurality of adjustable parameters each corresponding to an electromagnetic property of a material at one of the set of locations within the volume.

6. The system of claim 1, wherein the system of partial differential electromagnetic wave equations is solved via a finite element technique.

7. The system of claim 1, wherein the electromagnetic model comprises a plurality of adjustable parameters each corresponding to an electromagnetic property of a material at one of the set of locations within the volume and the processor is configured to adjust the predicted electromagnetic field values by adjusting the plurality of adjustable parameters.

8. The system of claim 7, wherein the processor is configured to receive the measured electromagnetic field data from the plurality of sensors.

9. The system of claim 8, wherein the measured electromagnetic field data comprises electromagnetic field data gathered before and after a hydraulic fracturing operation in the geologic formation using the well bore.

10. The system of claim 9, wherein the processor is configured to adjust the plurality of adjustable parameters such that the secondary electric field values at the set of sensor locations match a difference between the electromagnetic field data gathered before and after the hydraulic fracturing operation to within a predetermined range.

11. The system of claim 1, further comprising a second plurality of sensors at a second plurality of sensor locations and configured to gather a plurality of measured electromagnetic field values.

12. The system of claim 1, wherein the image comprises a three-dimensional image of the fracture.

13. The system of claim 1, wherein the proppant comprises non-conductive proppant and the conductive material comprises conductive proppant.

14. The system of claim 1, wherein the geophysical model describes Earth's surface, the well bore, the well casing in their respective three-dimensional shapes.

15. The system of claim 14, wherein the electromagnetic model utilizes a finite-elements numerical methodology.

16. A system, comprising:
an electrically conductive proppant pack located within an induced fracture;
an electric current source in electrical communication with at least a portion of the induced fracture and a plurality of sensors at a set of sensor location, wherein at least one sensor of the plurality of sensors is located at or near Earth's surface;
a database that stores:
a geophysical model of a volume of Earth including a geologic formation and a well bore,
a set of locations within the volume,
an electromagnetic model, and
the set of sensor locations; and
a processor configured to:
predict electromagnetic field values at the set of sensor locations using the electromagnetic model and the geophysical model by:
computing primary electric and/or magnetic field values at the set of locations within the volume; and
computing secondary electric and/or magnetic field values at the set of sensor locations using the primary electric and/or magnetic field values at the set of locations within the volume,
receive measured electromagnetic field data gathered at the set of sensor locations,
adjust, based on the measured electromagnetic field data, the predicted electromagnetic field values,
determine a location of the electrically conductive proppant pack using the adjusted predicted electromagnetic field values, and
generate an image of the electrically conductive proppant pack using the adjusted predicted electromagnetic field values.

17. The system of claim 16, wherein the plurality of sensors comprises a first plurality of sensors configured to detect electric fields and a second plurality of sensors configured to detect magnetic fields.

18. The system of claim 16, wherein a numerical modeling methodology selected from the group consisting of finite-differences, finite elements, discontinuous Galerkin, Green functions, and layered media propagators and any combination thereof is used to compute the primary electric and/or magnetic field values at the set of locations within the volume.

19. The system of claim 16, wherein the electromagnetic model comprises a Born approximation model having a plurality of Born scatterers at the set of locations within the volume.

20. The system of claim 19, wherein the Born approximation model comprises a plurality of adjustable parameters each corresponding to an electromagnetic property of a material at one of the set of locations within the volume and wherein the processor is configured to:
adjust the predicted electromagnetic field values by adjusting the plurality of adjustable parameters, and
receive the measured electromagnetic field data from the plurality of sensors.

21. The system of claim 16, wherein the electrically conductive proppant pack comprises non-conductive proppant.

22. A system, comprising:
a casing placed within a well bore extending from Earth's surface to a subterranean geologic formation;
a proppant pack comprising a non-conductive proppant and a conductive material;
an electric current source in electrical communication with at least a portion of the casing, at least a portion of the conductive material and a plurality of sensors at a set of sensor locations, wherein at least one sensor of the plurality of sensors is located at or near the Earth's surface;
a database that stores:
a geophysical model of a volume of Earth including Earth's surface, the casing, the geologic formation and the well bore,
a set of locations within the volume,
a finite elements model, and
the set of sensor locations; and
a processor configured to:
predict electromagnetic field values at the set of sensor locations using the finite elements model and the geophysical model by:

computing primary electric and/or magnetic field values at the set of locations within the volume; and computing secondary electric and/or magnetic field values at the set of sensor locations using the primary electric and/or magnetic field values at the set of locations within the volume, receive measured electromagnetic field data gathered at the set of sensor locations, adjust, based on the measured electromagnetic field data, the predicted electromagnetic field values, determine a location of the proppant pack using the adjusted predicted electromagnetic field values, and generate a three-dimensional image of the proppant pack using the adjusted predicted electromagnetic field values.

\* \* \* \* \*